(12) United States Patent  
Fusejima

(10) Patent No.: US 11,080,057 B2  
(45) Date of Patent: Aug. 3, 2021

(54) PROCESSING DEVICE AND METHOD OF CONTROLLING PROCESSING DEVICE

(71) Applicant: FUJITSU LIMITED, Kanagawa (JP)

(72) Inventor: Atushi Fusejima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/672,569

(22) Filed: Nov. 4, 2019

(65) Prior Publication Data

US 2020/0150963 A1 May 14, 2020

(30) Foreign Application Priority Data

Nov. 9, 2018 (JP) ............................ JP2018-211578

(51) Int. Cl.
*G06F 9/30* (2018.01)
*G06F 9/38* (2018.01)
*G06F 9/48* (2006.01)

(52) U.S. Cl.
CPC ...... *G06F 9/30145* (2013.01); *G06F 9/30196* (2013.01); *G06F 9/3814* (2013.01); *G06F 9/485* (2013.01); *G06F 9/382* (2013.01); *G06F 9/3822* (2013.01); *G06F 9/3838* (2013.01)

(58) Field of Classification Search
CPC ............ G06F 9/30145; G06F 9/30196; G06F 9/3814; G06F 9/485; G06F 9/382; G06F 9/3822; G06F 9/3838; G06F 9/461; G06F 9/4856; G06F 8/433
USPC .................. 712/216–219, 212, 213
See application file for complete search history.

(56) References Cited

U.S. PATENT DOCUMENTS

| | | | | |
|---|---|---|---|---|
| 5,600,806 A | * | 2/1997 | Brown ................. | G06F 9/30152 712/204 |
| 2001/0054138 A1 | * | 12/2001 | Kawaguchi ........... | G06F 9/3838 712/215 |
| 2008/0084424 A1 | * | 4/2008 | Hsu .......................... | G06T 1/20 345/522 |

FOREIGN PATENT DOCUMENTS

| | | |
|---|---|---|
| JP | 2003-323294 | 11/2003 |
| JP | 2007-328484 | 12/2007 |

* cited by examiner

*Primary Examiner* — Daniel H Pan
(74) *Attorney, Agent, or Firm* — Fujitsu Patent Center

(57) ABSTRACT

A processing device includes an instruction decode circuit including decoders that decode instructions respectively assigned an instruction number that is determined for every one of the decoders, an instruction execution circuit that executes the instructions decoded by the instruction decode circuit, an instruction complete holding circuit including hold blocks provided in correspondence with each of the decoders and respectively including hold regions assigned the instruction number, and used for an instruction complete process, and an instruction complete controller that stores instruction information that is generated by decoding the instructions by the decoders, in one of the hold regions of the hold block corresponding to the decoder that decodes the instruction, based on the instruction number, and obtain, in order, the instruction information corresponding to the instructions executed by the instruction execution circuit from the instruction complete holding circuit, to perform the instruction complete process.

16 Claims, 22 Drawing Sheets

| GID | CB0<br>IID=GID × 4 | CB1<br>IID=GID × 4+1 | CB2<br>IID=GID × 4+2 | CB3<br>IID=GID × 4+3 |
|---|---|---|---|---|
| 0 | 0 | 1 | 2 | 3 |
| 1 | 4 | 5 | 6 | 7 |
| 2 | 8 | 9 | 10 | 11 |
| 3 | 12 | 13 | 14 | 15 |
| 4 | 16 | 17 | 18 | 19 |
| 5 | 20 | 21 | 22 | 23 |
| 6 | 24 | 25 | 26 | 27 |
| : | : | : | : | : |
| 31 | 124 | 125 | 126 | 127 |
| | ⇐ FROM DS0 OR COMPUTING UNIT, ETC. | ⇐ FROM DS1 OR COMPUTING UNIT, ETC. | ⇐ FROM DS2 OR COMPUTING UNIT, ETC. | ⇐ FROM DS3 OR COMPUTING UNIT, ETC. |

FIG.11

| D or DT | CB0 (DS0) | CB1 (DS1) | CB2 (DS2) | CB3 (DS3) | GID |
|---|---|---|---|---|---|
| 1 | 0 | 1 | 2 | 3 | 0 |
| 2 | 4 | 5 | 6 |  | 1 |
| 3 | 8 | 9 | 10 | 11 | 2 |
| 4 | 12 | 13 | (14) | (15) | 3 |
| 5 |  |  | 14 | 15 | 3 |
| 6 | 16 | 17 | 18 |  | 4 |
| 7 |  | 21 | 22 |  | 5 |
| 8 | 24 | 25 | 26 |  | 6 |

FIG.12

| C | CSE-WINDOW | | | | GROUP COMMIT | GID |
|---|---|---|---|---|---|---|
|   | CB0 | CB1 | CB2 | CB3 | | |
| 1 | 0 (C) | 1 (C) | 2 (C) | 3 (C) | C | 0 |
| 2 | 4 (C) | 5 (C) | 6 (C) |  | C | 1 |
| 3 | 8 (C) | 9 (C) | 10 | 11 |  | 2 |
| 4 |  |  | 10 (C) | 11 (C) | C | 2 |
| 5 | 12 (C) | 13 (C) | 14 (C) | 15 (C) | C | 3 |
| 6 | 16 (C) | 17 | 18 |  |  | 4 |
| 7 |  | 17 (C) | 18 (C) |  | C | 4 |
| 8 |  | 21 (C) | 22 (C) |  | C | 5 |
| 9 | 24 (C) | 25 (C) | 26 |  |  | 6 |

FIG.18

| D or DT | DS0 | DS1 | DS2 | DS3 |
|---|---|---|---|---|
| 1 | 0(CB0) | 1(CB1) | 2(CB2) | 3(CB3) |
| 2 | 4(CB0) | 5(CB1) | 6(CB2) | |
| 3 | 7(CB3) | 8(CB0) | 9(CB1) | 10(CB2) |
| 4 | 11(CB3) | 12(CB0) | 13(CB1) | 14(CB2) |
| 5 | 13(CB1) | 14(CB2) | 15(CB3) | |
| 6 | 16(CB0) | 17(CB1) | | |
| 7 | 18(CB2) | 19(CB3) | | |
| 8 | 20(CB0) | 21(CB1) | 22(CB2) | |

FIG.19

| C | CSE-WINDOW | | | |
|---|---|---|---|---|
|   | 0 | 1 | 2 | 3 |
| 1 | 0(CB0)C | 1(CB1)C | 2(CB2)C | 3(CB3)C |
| 2 | 4(CB0)C | 5(CB1)C | 6(CB2) | 7(CB3)C |
| 3 | 6(CB2)C | 7(CB3)C | 8(CB0)C | 9(CB1) |
| 4 | 9(CB1)C | 10(CB2)C | 11(CB3)C | 12(CB0) |
| 5 | 12(CB0)C | 13(CB1) | 14(CB2) | 15(CB3) |
| 6 | 13(CB1)C | 14(CB2)C | 15(CB3)C | 16(CB0)C |
| 7 | 17(CB1)C | 18(CB2)C | 19(CB3) | 20(CB0) |
| 8 | 19(CB3)C | 20(CB0)C | 21(CB1)C | 22(CB2) |

PROCESSING DEVICE AND METHOD OF CONTROLLING PROCESSING DEVICE

CROSS-REFERENCE TO RELATED APPLICATIONS

This application is based upon and claims the benefit of priority of the prior Japanese Patent Application No. 2018-211578, filed on Nov. 9, 2018, the entire contents of which are incorporated herein by reference.

FIELD

The embodiments discussed herein are related to a processing device, and a method of controlling the processing device.

The processing device is sometimes also referred to as a processor, an arithmetic processing unit, or the like.

BACKGROUND

A superscalar processing device has an instruction decode unit including a plurality of decoders that respectively decode instructions, a reservation station that issues instructions to computing units or the like, an instruction execution unit including the computing units or the like that execute the instructions, and a commit stack entry that manages completion of issued instructions, for example. In this type of processing device, the instruction decode unit decodes, in order, the instructions received from an instruction buffer or the like, and the instruction execution unit executes, out of order, the instructions issued from the reservation station. Examples of such processing devices are described in Japanese Laid-Open Patent Publication No. 2007-328484, and Japanese Laid-Open Patent Publication No. 2003-323294, for example.

The instruction decode unit sequentially assigns an instruction number to each of the plurality of instructions that are decoded in parallel, and stores, in the commit stack entry, instruction information that is generated by decoding the instructions for every cycle. The commit stack entry includes a plurality of entries having the instruction numbers assigned thereto, and stores each of the plurality of instruction information supplied from the plurality of decoders for every cycle into the entry having the matching instruction number.

For example, even in a case where there exists a decoder that cannot decode the instruction in a certain cycle, the instruction number is not missed and is sequentially assigned to the decoded instruction in the next cycle. For this reason, there is a possibility that all of the instruction numbers will be assigned to the instructions that are decoded by each of the plurality of decoders. In other words, there is a possibility that the instruction information generated by each of the plurality of decoders that decode the instructions will be stored in all of the entries of the commit stack entry. Accordingly, in order to enable storing the instruction information generated by each of the plurality of decoders into the entry corresponding to the instruction number, a switching unit, such as a selector, a switch, or the like, and interconnections connected to the switching unit, are provided on an input side of the commit stack entry.

Instruction complete information that is output from the computing units or the like is added with the instruction number assigned by the instruction decode unit. For this reason, when storing the instruction complete information output from the computing units or the like into the commit stack entry, there is a possibility that the instruction complete information will be stored in all of the entries of the commit stack entry, similar to the case where the instruction information is stored in the commit stack entry. Accordingly, the switching unit for the instruction complete information, and the interconnections, are provided on the input side of the commit stack entry. Further, when obtaining the instruction information or the like held in the commit stack entry, based on an instruction complete report, the switching unit and the interconnections are provided on an output side of the commit stack entry that obtains the instruction information. For example, as the number of bits of the instruction information or the like becomes larger, the circuit scale of the switching unit becomes larger, and the number of interconnections also becomes larger. In addition, the larger the circuit scale and the number of interconnections become, the larger the power consumption of the processing device becomes.

SUMMARY

Accordingly, it is an object in one aspect of the embodiments to provide a processing device, and a method of controlling the processing device, which can reduce the increase of the scale of circuits and interconnections used to store instruction information to and obtain the instruction information from an instruction complete holding unit (or circuit) that is used in an instruction complete process.

According to one aspect of the embodiments, a processing device includes an instruction decode circuit including a plurality of decoders configured to decode instructions respectively assigned an instruction number that is determined for every one of the plurality of decoders; an instruction execution circuit configured to execute the instructions decoded by the instruction decode circuit; an instruction complete holding circuit including a plurality of hold blocks provided in correspondence with each of the plurality of decoders and respectively including a plurality of hold regions, wherein the instruction number is assigned to each of the plurality of hold regions, and used for an instruction complete process; and an instruction complete controller configured to store instruction information that is generated by decoding the instructions by the plurality of decoders, in one of the plurality of hold regions of the hold block corresponding to the decoder that decodes the instruction, based on the instruction number, and obtain, in order, the instruction information corresponding to the instructions executed by the instruction execution circuit from the instruction complete holding circuit, to perform the instruction complete process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of IID assignments of the CSE 240 and the CSE 242 illustrated in FIG. 7;

FIG. 11 is a diagram illustrating an example of assignments of instruction data or the like stored in the CSE 240 illustrated in FIG. 8 and the CSE 242 illustrated in FIG. 9;

FIG. 12 is a diagram illustrating an example of assignments of instruction data or the like stored in a CSE-WINDOW illustrated in FIG. 8 and FIG. 9;

FIG. 18 is a diagram illustrating an example of assignments of instruction data or the like stored in the CSE 240 illustrated in FIG. 16 and the CSE 242 illustrated in FIG. 17;

FIG. 19 is a diagram illustrating an example of assignments of instruction data or the like stored in the CSE-WINDOW illustrated in FIG. 16 and FIG. 17;

DESCRIPTION OF EMBODIMENTS

Preferred embodiments of the present invention will be described with reference to the accompanying drawings.

A description will be given of a processing device, and a method of controlling the processing device, according to each embodiment.

Figure 1:
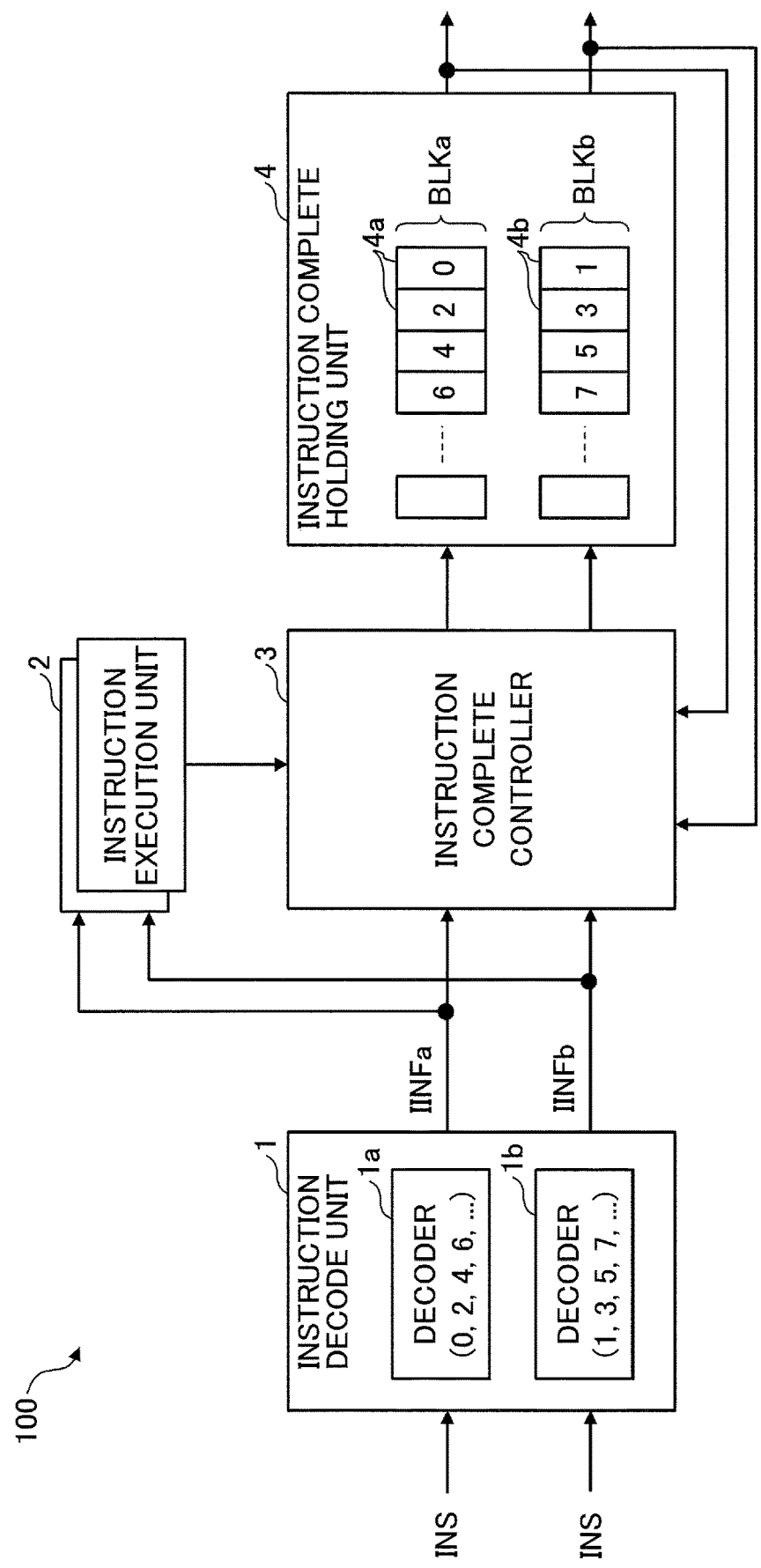
FIG. 1 is a diagram illustrating an example of a processing device and a method controlling the processing device according to a first embodiment.

FIG. 1 is a diagram illustrating an example of a processing device and a method controlling the processing device according to a first embodiment. A processing device 100 illustrated in FIG. 1 includes an instruction decode unit (or circuit) 1, instruction execution units (or circuits) 2, an instruction complete controller 3, and an instruction complete holding unit (or circuit) 4. For example, the processing device 100 is a superscalar processor.

The instruction decode unit 1 includes a plurality of decoders 1a and 1b that decode respective instructions INS. The instruction decode unit 1 determines instruction numbers (0, 1, 2, 3, . . . ) assigned to the instructions INS, for each of the decoders 1a and 1b. The decoders 1a and 1b decode the received instructions INS in parallel, and output instruction information IINF (IINFa and IINFb) that are coded results, respectively.

The instruction execution units 2 execute the instructions INS (IINFa and IINFb) decoded by the instruction decode unit 1. The instruction execution units 2 may execute the instructions INS, out of order (or out-of-order). In this case, the processing device 100 may include a reservation station that receives and stores, in order (or in-order), the instructions INS from the instruction decode unit 1, and issues the held instructions, out of order, to the instruction execution units 2.

The number of instruction execution unit 2 may be other than two. In a case where the processing device 100 includes a plurality of instruction execution units 2, the types of instructions (or instruction types) executed by the instruction execution units 2 may be the same, or may be different. The instruction execution units 2 may include a function to generate an access address with respect to a memory, in order to execute a memory access instruction. In addition, the instruction execution units 2 may include a function to perform a branch process with respect to a branch instruction.

The instruction complete holding unit 4 includes a hold block BLKa including a plurality of hold regions 4a provided in correspondence with the decoder 1a, and a hold block BLKb including a plurality of hold regions 4b provided in correspondence with the decoder 1b. Instruction numbers (for example, even numbers) are successively assigned to the plurality of hold regions 4a. Instruction numbers (for example, odd numbers), that are different from the instruction numbers assigned to the plurality of hold regions 4a, are successively assigned to the plurality of hold regions 4b. For example, in a case where the decoder 1a does not decode the instruction that is planned to be assigned the instruction number "4", the instruction number "4" is regarded as an unused (or unobtainable) number. In this case, the instruction number "4" will not be assigned to the instruction that is next decoded by the decoder 1b.

The instruction complete controller 3 stores the instruction information IINFa generated by the decoder 1a, into one of the plurality of hold regions 4a having the matching instruction number, and stores the instruction information IINFb generated by the decoder 1b, into one of the plurality of hold regions 4b having the matching instruction number. In addition, the instruction complete controller 3 obtains from the instruction complete holding unit 4, in order, the instruction information IINF corresponding to the instruction INS executed by the instruction execution unit 2, and performs an instruction complete process.

In the processing device 100 illustrated in FIG. 1, the instruction numbers assigned to the instructions INS are determined for each of the decoders 1a and 1b, and the hold regions 4a and 4b for holding the instruction information IINF are determined for each of the decoders 1a and 1b. For this reason, the instruction information IINFa generated by the decoder 1a is stored in one of the plurality of hold regions 4a, and will not be stored in any of the plurality of hold regions 4b. On the other hand, the instruction information IINFb generated by the decoder 1b is stored in one of the plurality of hold regions 4b, and will not be stored in any of the plurality of hold regions 4a.

Accordingly, the processing device 100 can store the instruction information IINF in the hold regions 4a and 4b, without having to provide a switching unit to switch a storage destination of the instruction information IINF to one of the hold regions 4a and 4b, and interconnections connected to this switching unit, on the input side of the instruction complete holding unit 4. In addition, the processing device 100 can read the instruction information IINF stored in the hold regions 4a and 4b, without having to provide a switching unit to switch an output destination of the instruction information IINF read from each of the hold regions 4a and 4b, and interconnections connected to this switching unit, on the output side of the instruction complete holding unit 4.

Because each instruction information IINF is on the order of several tens of bits, for example, if the switching unit and the interconnections were provided, the effects of the number of elements forming the switching unit and the number of interconnections on the circuit scale would be large. As a result, the processing device 100 can reduce the increase of the circuit scale, when compared to the case where the switching unit and the interconnections are provided.

Figure 2:
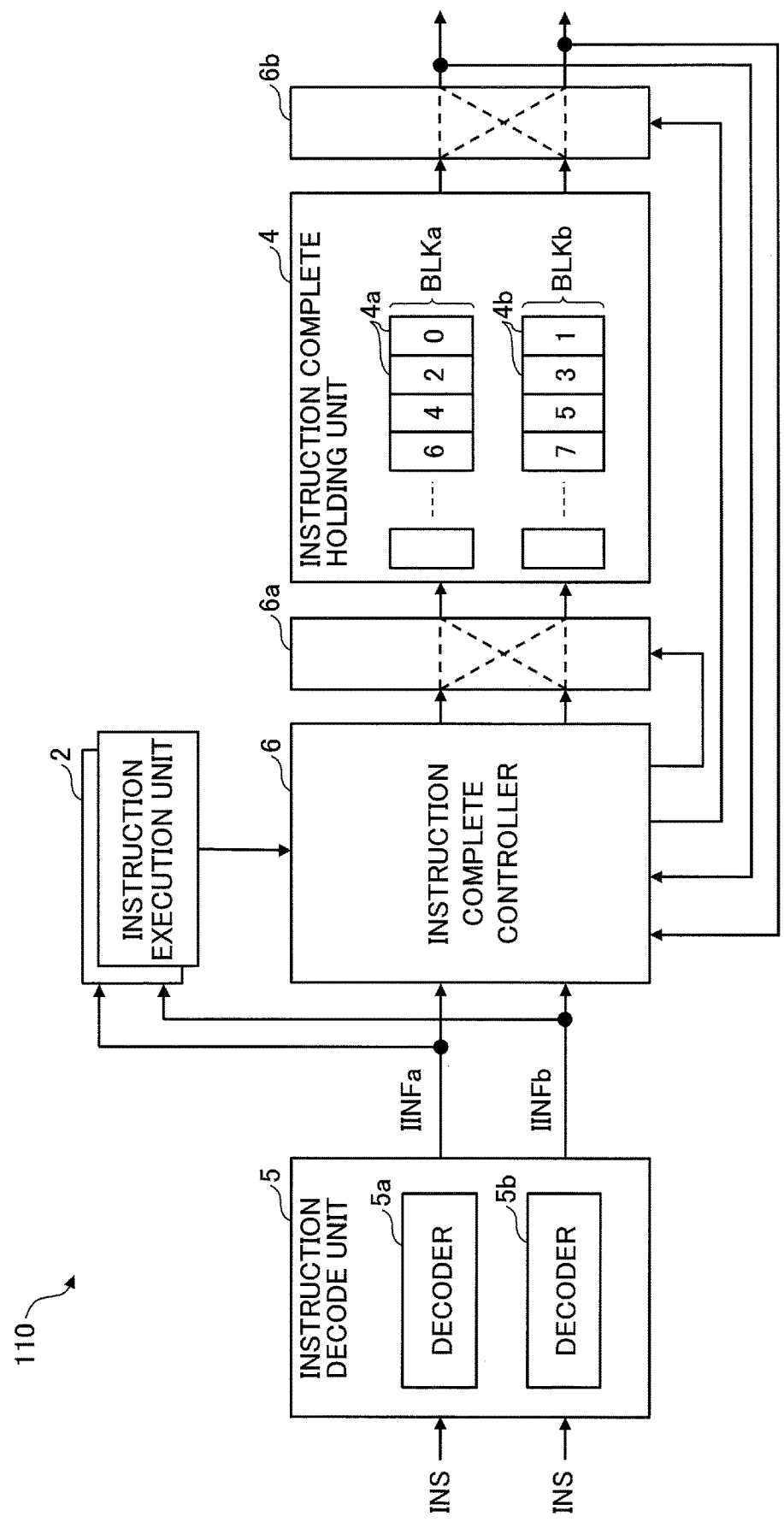
FIG. 2 is a diagram illustrating an example of the processing device according to a comparison example.

FIG. 2 is a diagram illustrating an example of the processing device according to a comparison example. A processing device 110 illustrated in FIG. 2 includes an instruction decode unit 5 and an instruction complete controller 6, in place of the instruction decode unit 1 and the instruction complete controller 3 of the processing device 100 illustrated in FIG. 1. In addition, the processing device 110 includes a switching unit 6a connected to the input side of the instruction complete holding unit 4, a switching unit 6b connected to the output side of the instruction complete holding unit 4, and interconnections connected to the switching units 6a and 6b.

The instruction decode unit 5 includes a plurality of decoders 5a and 5b that decode the respective instructions INS. The instruction decode unit 5 determines, according to a decoding sequence, the instruction numbers assigned to the instructions INS decoded by the decoders 5a and 5b, respectively. For this reason, in a cycle in which the decoder 5a does not decode the instruction INS, for example, an instruction number that is an even number may be assigned to the instruction decoded by the decoder 5b. Similarly, an instruction number that is an odd number may be assigned to the instruction decoded by the decoder 5a.

Hence, the instruction complete controller 6 controls the switching unit 6a based on the instruction number included in the instruction information IINF, and stores the instruction information IINF in one of the hold regions 4a and 4b. Further, the instruction complete controller 6 controls the switching unit 6b, to obtain the instruction information IINF of the instruction INS the execution of which is completed, from one of the hold regions 4a and 4b, to output the obtained instruction information IINF. According to the processing device 110 illustrated in FIG. 2, the switching units 6a and 6b and the interconnections are provided, because the hold regions 4a and 4b are provided in common to the decoders 5a and 5b. Consequently, the circuit scale of the processing device 110 increases, when compared to the processing device 100 illustrated in FIG. 1.

In the embodiment illustrated in FIG. 1, the instruction numbers assigned to the instructions are determined for each of the decoders 1a and 1b, so that the instruction information IINFa generated by the decoder 1a is stored in the hold region 4a, and the instruction information IINFb generated by the decoder 1b is stored in the hold region 4b. For this reason, it is unnecessary to provide a switching unit and interconnections on the input side and on the output side of the instruction complete holding unit 4, and the processing device 100 can reduce the increase of the circuit scale.

Figure 3:
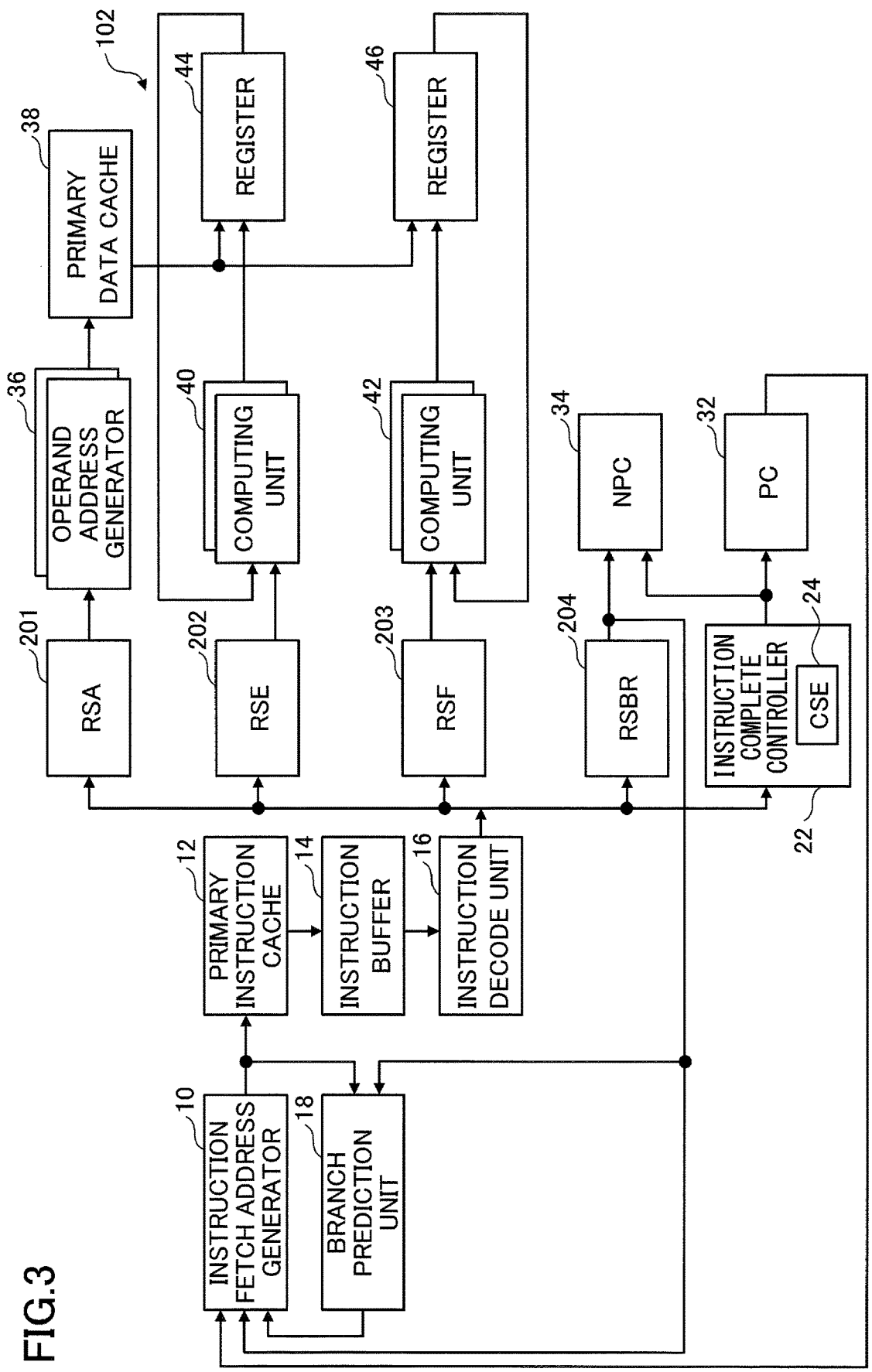
FIG. 3 is a diagram illustrating an example of the processing device according to a second embodiment.

FIG. 3 is a diagram illustrating an example of the processing device according to a second embodiment. For example, a processing device 102 illustrated in FIG. 3 is a superscalar processor.

The processing device 102 includes an instruction fetch address generator 10, a primary instruction cache 12, an instruction buffer 14, an instruction decode unit 16, a branch prediction unit 18, and reservation stations 20 (201, 202, 203, and 204). The processing device 102 also includes an instruction complete controller 22 that includes a commit stack entry 24, a Program Counter (PC) 32, a Next Program Counter (NPC) 34, an operand address generator 36, and a primary data cache 38. The processing device 102 further includes computing units 40 and 42, a fixed-point number register 44, and a floating-point number register 44. The commit stack entry 24 may be provided externally to the instruction complete controller 22. The computing units 40 and 42 form an example of an instruction execution unit.

The instruction fetch address generator 10 generates an address for fetching an instruction, based on an address that is successively generated, an address received from the branch prediction unit 18, and information from the reservation station 204. The instruction fetch address generator 10 outputs the generated address to the primary instruction cache 12. For example, in a case where a pipeline clear is generated based on a branch misprediction of the branch prediction unit 18, an instruction fetch is resumed using a correct branch destination address output from the reservation station 204 (RSBR).

The primary instruction cache 12 obtains the instruction held in a region indicated by the address received from the instruction fetch address generator 10, and outputs the obtained instruction to the instruction buffer 14. In a case where the primary instruction cache 12 does not hold the instruction corresponding to the address, an access request is output to a secondary cache (not illustrated) in order to obtain the instruction from the secondary cache. The secondary cache holds the instruction and data. In a case where the secondary cache does not hold the instruction corresponding to the address, an access request is output to a main memory (not illustrated) in order to obtain the instruction from the main memory.

The instruction buffer 14 holds the instruction output from the primary instruction cache 12, and outputs the held instruction to the instruction decode unit 16. For example, the instruction buffer 14 outputs 4 instructions in parallel to the instruction decode unit 16.

The instruction decode unit 16 decodes each of the plurality of instructions output from the instruction buffer 14, and determines the reservation station 20 (one of 201, 202, 203, and 204) at the output destination of each of the plurality of instructions. The instruction decode unit 16 issues instruction data, obtained by the decoding, to the reservation station 20 that is determined. The instruction data is the decoded result that is generated by decoding the instruction by a decode slot DS illustrated in FIG. 6 which will be described later, and is an example of the instruction information.

For example, in a case where the decoded instruction is a memory access instruction (a load instruction or a store instruction), the instruction decode unit 16 inputs the instruction to the reservation station 201. In a case where the decoded instruction is a fixed-point number operation instruction, the instruction decode unit 16 inputs the instruction to the reservation station 202. In a case where the decoded instruction is a floating-point number operation instruction, the instruction decode unit 16 inputs the instruction to the reservation station 203. In a case where the decoded instruction is a branch instruction, the instruction decode unit 16 inputs the instruction to the reservation station 204.

In addition, the instruction decoded unit 16 assigns an Instruction Identification (IID) and a Group Identification (GID) to the instruction according to a description sequence within a program that is executed by the processing device 102. The IID is an example of the instruction number assigned to the instruction, and the GID is an example of a group number assigned in correspondence with the IID that is assigned for every decode cycle.

The instruction decode unit 16 outputs the IID to the reservation station 20, together with the decoded result, and outputs the GID to the instruction complete controller 22, together with the decoded result. The instruction buffer 14 and the instruction decode unit 16 process the plurality of instruction in parallel, in order, without changing the description sequence within the program. In the following description, the IID may also be referred to as an instruction number IID, and the GID may also be referred to as the group number GID.

The branch prediction unit 18 predicts whether a branch is performed by a branch instruction, based on the address generated by the instruction fetch address generator 10, and in a case where the branch is predicted, the branch prediction unit 18 outputs a branch destination address to the instruction fetch address generator 10.

The reservation station 201 holds the memory access instructions successively received from the instruction decode unit 16, and outputs the held memory access instructions in an executable sequence to the operand address generator 36. In the following description, the reservation station 201 may also be referred to as a Reservation Station for Address generation (RSA) 201. The reservation station 202 holds the fixed-point number operation instructions successively received from the instruction decode unit 16, and outputs the held fixed-point number operation instructions in an executable sequence to the computing unit 40. In the following description, the reservation station 202 may also be referred to as a Reservation Station for Execution (RSE) 202.

The reservation station 203 holds the floating-point number operation instructions successively received from the instruction decode unit 16, and outputs the held floating-point number operation instructions in an executable sequence to the computing unit 42. In the following description, the reservation station 203 may also be referred to as a Reservation Station for Floating point (RSF) 203. The operation instructions issued to the computing units 40 and 42 are performed, out of order, regardless of the description sequence in the program.

The reservation station 204 holds the branch instructions successively received from the instruction decode unit 16, until the branch becomes judgeable. The reservation station 204 judges whether the branch prediction of the branch prediction unit 18 is successful, based on the branch instruction, and updates the value of the NPC 34 based on the judgment result. In addition, the reservation station 204 outputs information indicating that the judgment of the branch prediction is completed, to the branch prediction unit 18. In the following description, the reservation station 204 may also be referred to as a Reservation Station for BRanch (RSBR) 204.

The instruction complete controller 22 includes the commit stack entry 24 having a queue structure for storing the instructions decoded by the instruction decode unit 16, in the description sequence within the program. In the following description, the commit stack entry 24 may also be referred to as the Commit Stack Entry (CSE) 24 or simply "CSE". The instruction complete controller 22 performs an instruction complete process, in order, according to the description sequence within the program, based on the information held by the CSE 24 and instruction execution complete reports from the computing units 40 and 42, or the like. In other words, the instruction complete controller 22 performs the instruction complete process, in order, based on the instructions the execution of which is completed out of order. In the following description, the instruction complete process may also be referred to as "commit".

The PC 32 updates the memory address indicating the storage destination of the instruction, based on the instruction from the instruction complete controller 22, and outputs the updated memory address to the instruction fetch address generator 10. The NPC 34 holds the memory address next to the memory address held by the PC 32. In a case where the instruction decode unit 16 decodes a maximum of 4 instructions in parallel, the value of the PC 32 and the value of the NPC 34 are updated in correspondence with the number of instructions for which the instruction complete process is performed.

The operand address generator 36 generates an address based on the memory access instruction input from the RSA 201, and outputs the generated address to the primary data cache 38. The primary data cache 38 is accessed by the address from the operand address generator 36, and inputs and outputs data. The processing device 102 illustrated in FIG. 3 includes a plurality of operand address generators 36, however, only one operand address generator 36 may be provided.

In a case where the primary data cache 38 does not hold the data corresponding to the address, the primary data cache 38 outputs an access request to a secondary cache (not illustrated) in order to obtain the data from the secondary cache, similar to the case where the primary instruction cache 12 does not hold the instruction corresponding to the address. In the case of the load instruction, for example, the primary data cache 38 stores the obtained data in one of the registers 44 and 46.

The computing unit 40 is a computing unit for fixed-point number. For example, the processing device 102 may include a plurality of computing units 40 to execute, in parallel, the fixed-point number operation instructions decoded in parallel by the instruction decode unit 16. The computing unit 40 acquires the data used for the operation, from the register 44, and stores an operation result in the register 44.

The computing unit 42 is a computing unit for floating-point number. For example, the processing device 102 may include a plurality of computing units 42 to execute, in parallel, the floating-point number operation instructions decoded in parallel by the instruction decode unit 16. The computing unit 42 acquires the data used for the operation, from the register 46, and stores an operation result in the register 46.

The register 44 holds the data used for the operation performed by the computing unit 40, and holds an operation result of the computing unit 40. The register 46 holds the data used for the operation performed by the computing unit 42, and holds an operation result of the computing unit 42.

The registers 44 and 46 have a register file structure, and include a plurality of registers, respectively. For example, the registers 44 and 46 share a register file, and an update buffer to hold the operation result or the like until being stored in the register file, and employ a physical register system that manages the register using a rename table or the like. Each of the registers 44 and 46 may be replaced by an update buffer and a register file.

Figure 4:
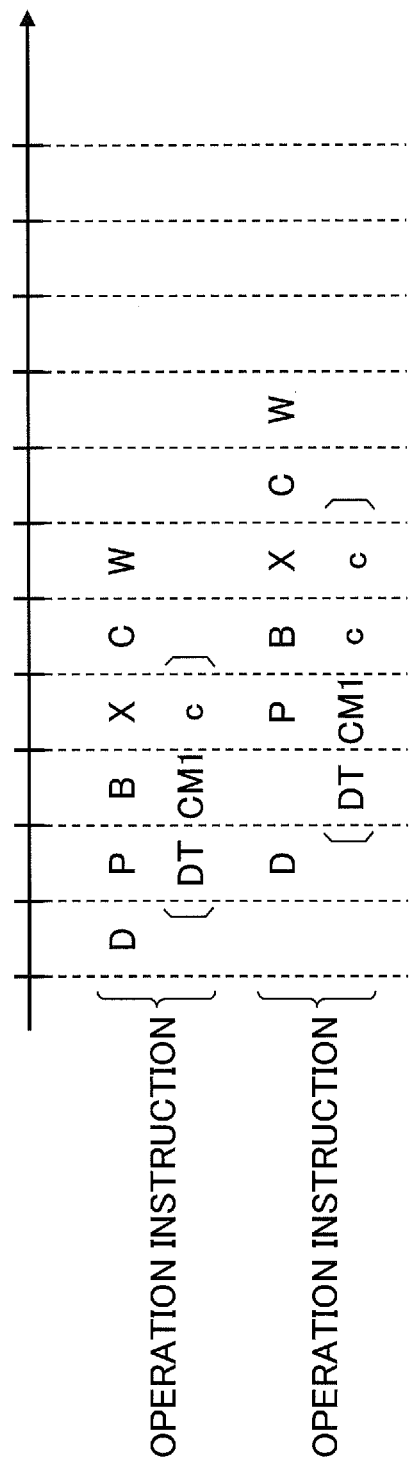
FIG. 4 is a diagram illustrating an example of a pipeline process of the processing device illustrated in FIG. 3.

FIG. 4 is a diagram illustrating an example of a pipeline process of the processing device 102 illustrated in FIG. 3. The pipeline process is not limited to the example illustrated in FIG. 4. For example, the processing device 102 executes the operation instruction by the pipeline process including a decode stage D, a priority stage P, a buffer stage B, an operation execution stage X, an instruction complete stage C, and a write stage W. Stages in square brackets, including a decode transfer stage DT, an obtaining stage CM1, and a completion wait stage c, belong to a pipeline process related to the operation of the instruction complete controller 22.

In the following description, the decode stage D, the priority stage P, the buffer stage B, the operation execution stage X, the instruction complete stage C, and the write stage W may also be referred simply as stages D, P, B, X, C, and W, respectively. The decode transfer stage DT, the obtaining stage CM1, and the completion wait stage c may also be referred simply as stages DT, CM1, and c, respectively. In addition, cycles in which the stages D, P, B, X, C, W, DT, CM1, and c are executed may also be referred to as cycles D, P, B, X, C, W, DT, CM1, and c, respectively.

In the stage D, the instruction decode unit 16 decodes, in order, the instructions output from the instruction buffer 14. Further, the instruction decode unit 16 outputs the decoded instructions, together with the GID, to the instruction complete controller 22, and outputs the decoded instructions, together with the IID, to the reservation stations 201, 202, 203, and 204 based on the instruction types.

In the stage P, each reservation station 20 selects, out of order, the executable instructions that became executable. In a case where each reservation station 20 cannot issue an instruction due to a busy state or the like of a computing resource or the like, a vacant cycle is inserted between the stage D and the stage P of the pipeline process of the operation instruction illustrated in the lower half of FIG. 4.

In the stage B, the computing units 40 and 42 or the like read the data or the like used for the instruction selected by the stage P, from the registers 44 and 46 or the like. In the stage X, the computing units 40 and 42 or the like executes the instruction selected by the stage P, using the data read from the registers 44 and 46 or the like by the stage B.

In the stage DT, the instruction complete controller 22 registers, in order, the instructions output from the instruction decode unit 16, in entries of the CSE 24 corresponding to the GID. Even in the case where the vacant cycle is inserted between the stage D and the stage P of the pipeline process of the operation instruction illustrated in the lower half of FIG. 4, the stage DT is executed in the cycle next to the stage D.

Figure 8:
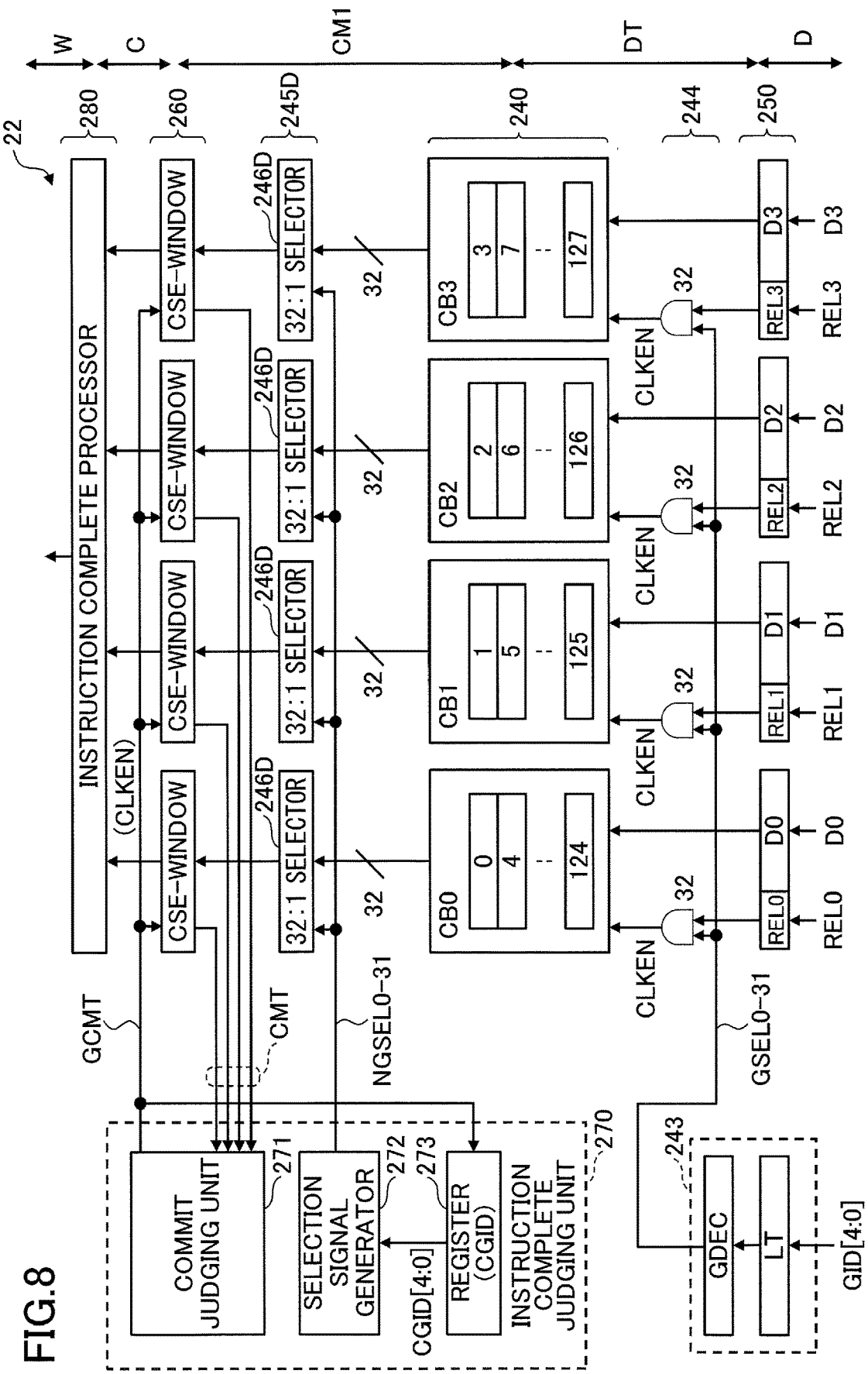
FIG. 8 is a diagram illustrating an example of a CSE 240 and related circuits illustrated in FIG. 7.

In the stage CM1, the instruction complete controller 22 obtains, in order, the instructions registered in the CSE 24, based on the instruction execution complete reports, and sets the obtained instructions in a CSE-WINDOW 260 illustrated in FIG. 8. In a case where the target instruction to be obtained cannot be obtained from the CSE 24, a vacant cycle is inserted between the stage DT and the stage CM1.

The stage c is inserted until the instruction execution complete reports are issued, that is, until the instructions are completed by the stage X. In the stage c corresponding to the stage X, the computing units 40 and 42 store the operation results in the registers 44 and 46 or the like, and wait until complete reports indicating completion of the operations are output to the instruction complete controller 22. In a case where an operation exception is generated, the computing units 40 and 42 output information indicating the generation of the operation exception to the instruction complete controller 22.

In the case where the instruction is the load instruction or the store instruction, the primary data cache 36, in the stage c corresponding to the stage X, waits until complete information indicating completion of a data transfer is output to the instruction complete controller 22. In the case where the instruction is the branch instruction, the RSBR 204, in the stage c corresponding to the stage X, outputs to the instruction complete controller 22 complete information indicating completion of judgment with respect to the branch prediction of the branch prediction unit 18. In the stage C, the instruction complete controller 22 starts, in order, the instruction complete process, based on each complete information. In the stage W, the value of the PC 32 and the value of the NPC 34 are updated, and the resources, such as the registers 44 and 46 or the like used to execute the instructions, are released.

Figure 5:
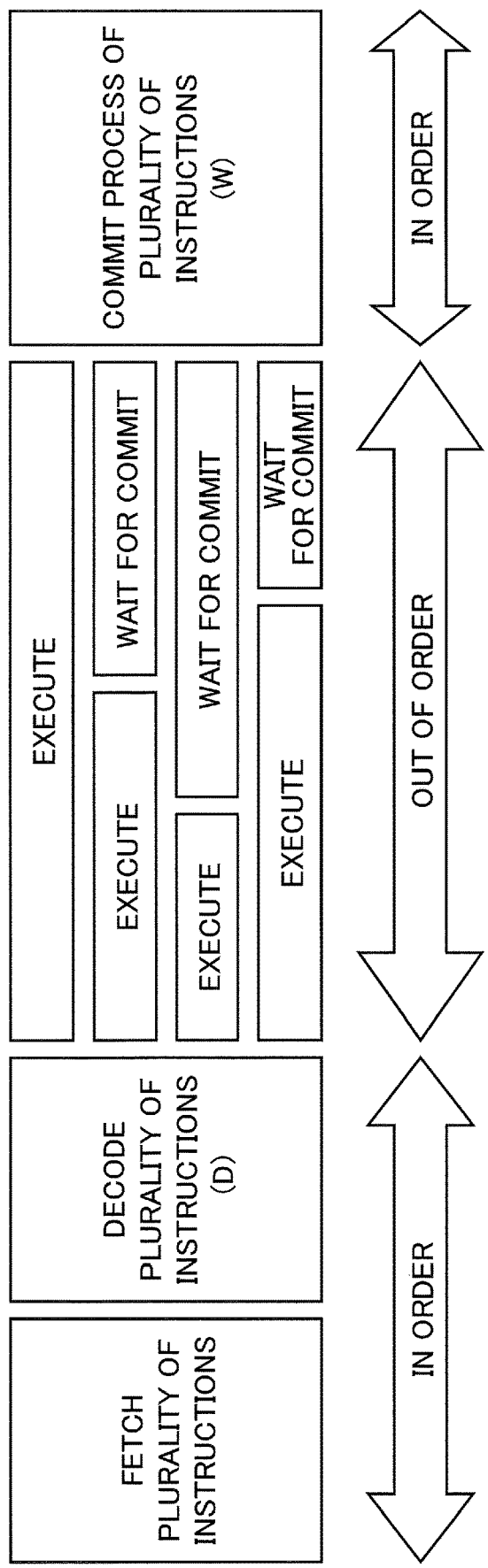
FIG. 5 is a diagram illustrating an example of a superscalar out of order execution.

FIG. 5 is a diagram illustrating an example of a super-scalar out of order execution. In FIG. 5, the processing device 102 executes a maximum of 4 instructions in parallel. For example, the plurality of instructions fetched, in order, from the primary instruction cache 12 based on the addresses output from the instruction fetch address generator 10, are output to the instruction decode unit 16 via the instruction buffer 14. For example, the number of instructions output in parallel from the primary instruction cache 12 is greater than the number of instructions (for example, 4 instructions) output in parallel from the instruction buffer 14 to the instruction decode unit 16.

The instruction decode unit 16 decodes, in order, the plurality of instructions output from the instruction buffer 14, in the stage D. The computing units 40 and 42 execute, out of order, the plurality of instructions decoded by the instruction decode unit 16. The number of cycles (the number of stages X) required for the operations of the computing units 40 and 42, differs depending on the instruction types.

Among the 4 instructions executed in parallel, when the execution of the instruction occurring later in the description sequence within the program is completed before the execution of the instruction occurring early in the description sequence within the program, the instruction complete process of the stage W is not performed until the execution of the instruction occurring early in the description sequence within the program is completed. In the example illustrated in FIG. 5, the instruction complete process is not started until the execution of the instruction occurring earliest (top instruction) in the description sequence within the program is completed. Hence, it is possible to complete, in order, the plurality of instructions that are executed out of order. Further, in the stage W, the resources, such as the registers 44 and 46 or the like used to execute the instructions, are released, and the plurality of instruction complete processes (commit processes) are performed, in order, to complete execution of the instructions.

Figure 6:
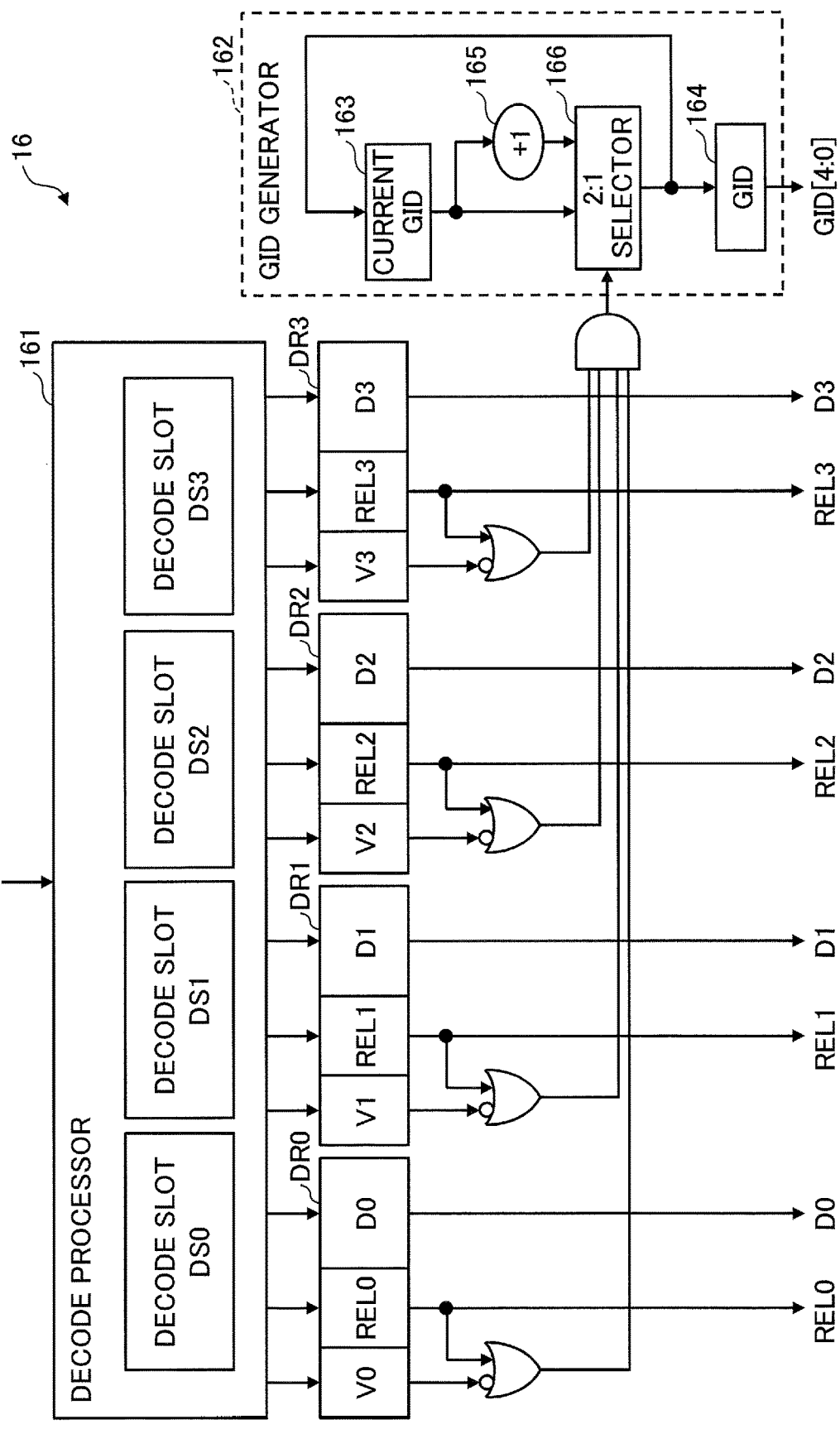
FIG. 6 is a diagram illustrating an example of an instruction decode unit illustrated in FIG. 3.

FIG. 6 is a diagram illustrating an example of the instruction decode unit 16 illustrated in FIG. 3. The instruction decode unit 16 includes a decode processor 161 that includes 4 decode slots DS (DS0, DS1, DS2, and DS3), decode registers DR (DR0, DR1, DR2, and DR3), and a GID generator 162. Each decode slot DS is an example of a decoder that decodes the instruction output from the instruction buffer 14.

Each decode register DR is provided in correspondence with each decode slot DS. Of course, one decode register DR may correspond to a plurality of decode slots DS. Alternatively, a plurality of decode registers DR may correspond to one decode slot DS. The number of decode slots DS is not limited to 4, and may be an arbitrary plural number other than 4. In the following description, it is assumed for the sake of convenience that each decode register DR corresponds to each decode slot DS.

The decode processor 161 receives, in order, the plurality of instructions output in parallel from the instruction buffer 14, and performs instruction decoding, resource allocation, register renaming, or the like for every decode slot DS. Each decode register DR includes a valid flag V, a release flag REL, and a data region D.

The valid flag V is set to "1" when the corresponding decode slot DS decodes the instruction. For example, when 3 instructions are received from the instruction buffer 14, the valid flags V corresponding to the 3 decode slots DS are set to "1", and the valid flag V corresponding to the remaining decode slot DS is reset to "0".

The release flag REL is set to "1" when the corresponding decode slot DS decodes the instruction, and requirements such as the resources or the like used for the instruction are satisfied. The data region D stores the decoded results (instruction data D (D0 through D3)) by the corresponding decode slots DS. Although not illustrated, the instruction decode unit 16 assigns the IID for every decoded instruction. For example, the IID is set to one of "0" through "127", according to the number of instructions (128 instructions) storable in the CSE 24.

The GID generator 162 includes latches 163 and 164 that hold the GID, an incrementor 165, and a selector 166. The latch 163 latches an output of the selector 166. The incrementor 165 increments, by "1", a current GID output from the latch 163, and outputs the incremented GID to the selector 166. For example, the incrementor 165 is a counter that cyclically generates the GID of GID="0" to GID="31".

In a case where an output of a 4-input AND circuit has a logical value "0", the selector 166 selects the output of the latch 163, and does not update the GID. On the other hand, in a case where the output of the 4-input AND circuit has a logical value "1", the selector 166 selects the output of the incrementor 165 and updates the GID. In the case where the instruction decode unit 16 receives the instructions from the instruction buffer 14, the state of each decoder register DR becomes such that the valid flag V="1" and the resource flag REL="0". In addition, when the instruction becomes issuable, the valid flag V becomes V="1", and the resource flag REL becomes REL="1".

In a case where at least one of the decode registers DR, excluding the decode register DR having the valid flag V that is V="0", is in the state such that such that the valid flag V="1" and the resource flag REL="0", the output of the 4-input AND circuit has the logical value "0", and the GID is not updated. On the other hand, in a case where all of the decode registers DR, excluding the decode register DR having the valid flag V that is V="0", is in the state such that such that the valid flag V="1" and the resource flag REL="1", the output of the 4-input AND circuit has the logical value "1", and the GID is updated. The GID is also updated in a case where all of the valid flags V0 to V3 are reset.

Figure 7:
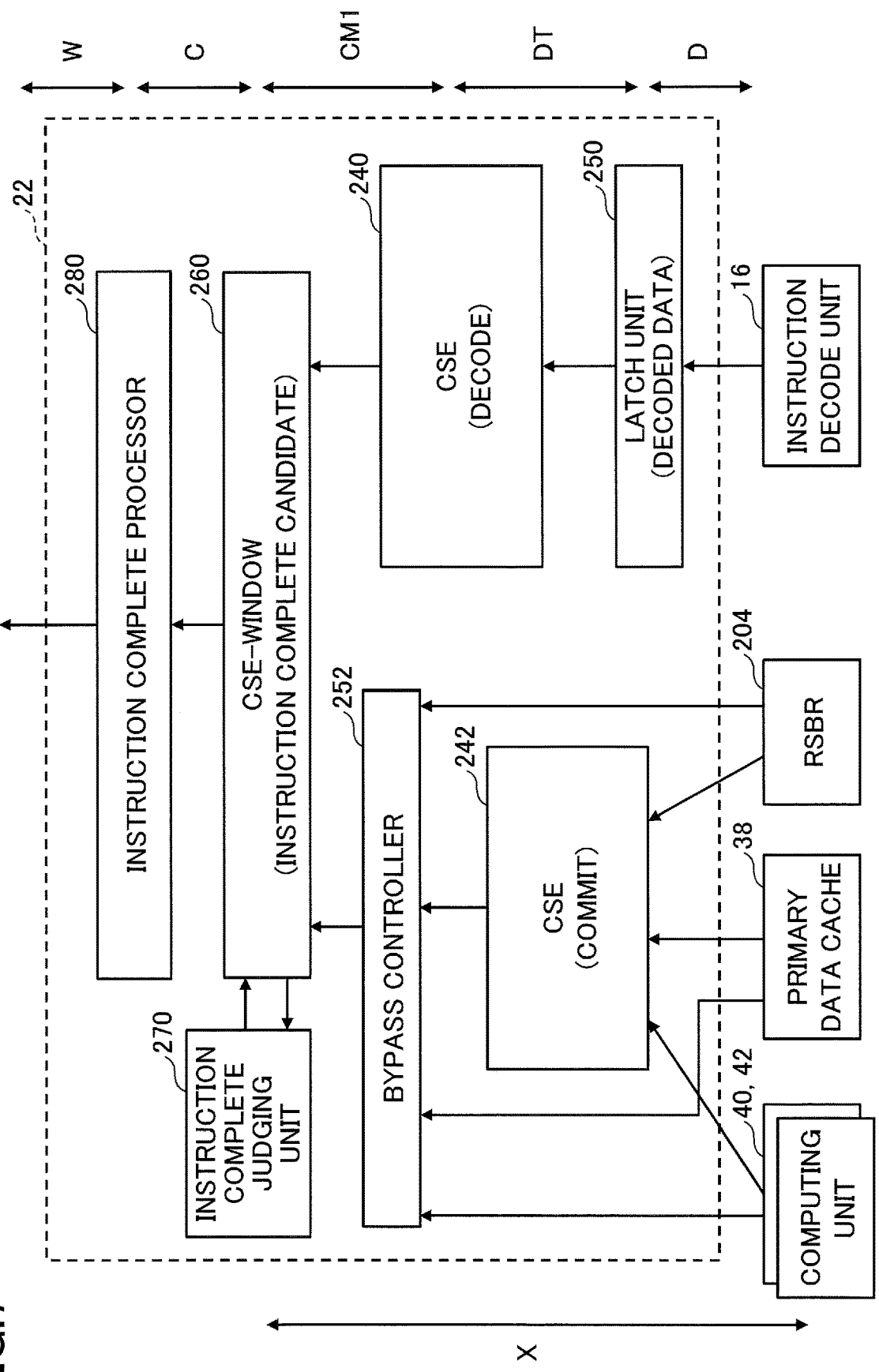
FIG. 7 is a diagram illustrating an example of an instruction complete controller illustrated in FIG. 3.

FIG. 7 is a diagram illustrating an example of the instruction complete controller 22 illustrated in FIG. 3. The stages D, DT, CM1, C, W, and X illustrated in FIG. 7 correspond to the stages D, DT, CM1, C, W, and X illustrated in FIG. 4, respectively. The instruction complete controller 22 includes, as the CSE 24, a CSE 240 for the decoded instruction, and a CSE 242 for the commit (completion). The CSE 240 and the CSE 242 form an example of an instruction complete holding unit that is used in the instruction complete process. The instruction complete controller 22 includes a latch unit 250, a bypass controller 252, the CSE-WINDOW 260, an instruction complete judging unit (or circuit) 270, and an instruction complete processor 280. The CSE-WINDOW 260 is an example of an instruction complete buffer that holds the instruction data D corresponding to the group number GID that is assigned to the instruction of the oldest cycle the execution of which is not completed. The group number GID that is assigned to the instruction of the oldest cycle the execution of which is not completed, is an example of an oldest group number.

The CSE 240 (decode) holds the plurality of instruction data D (decoded results: physical addresses, resource types used, etc.) received from the instruction decode unit 16 via the latch unit 250, in entries instructed from the instruction decode unit 16. The latch unit 250 holds the plurality of instruction data D (decoded results) obtained by the decoding performed by the instruction decode unit 16. The CSE 242 (commit) holds the instruction complete reports output from the computing units 40 and 42, the primary data cache 38, the RSBR 204, or the like, in the instructed entries. The instruction complete reports output from the computing units 40 and 42, the primary data cache 38, the RSBR 204, or the like are issued out of order, and the instruction complete reports are generated at different timings. Examples of the CSE 240 and the CSE 242 are illustrated in FIG. 8 through FIG. 11.

The bypass controller 252 transfers the IID included in the complete reports output from the computing units 40 and 42, the primary data cache 38, the RSBR 204, or the like, to the CSE-WINDOW 260 before being stored in the CSE 242. Hence, in a case where the instruction (data) including the same IID is set in the CSE-WINDOW 260, it becomes possible to perform the instruction complete process before the data including the complete information is output from the CSE 242. In a case where the IID included in the complete report from the computing units 40 and 42 or the like is not set in the CSE-WINDOW 260, the instruction complete process is performed based on setting of the complete information from the CSE 242 to the CSE-WINDOW 260.

The instruction data D obtained, in order, from the CSE 240 and the CSE 242 based on the instruction execution complete report, are set to the CSE-WINDOW 260 as instruction complete candidates. The instruction data D held in the CSE-WINDOW 260 are output, in order, to the instruction complete processor 280 based on the complete report.

The instruction complete judging unit 270 judges whether the complete report of each of the plurality of instructions corresponding to the plurality of instruction data D held in the CSE-WINDOW 260 is issued. In a case where the complete report of each of the plurality of instructions corresponding to the plurality of instruction data D held in the CSE-WINDOW 260 is issued, the instruction complete judging unit 270 controls the output of the instruction data D of the instructions the complete reports of which are issued, to the instruction complete processor 280. In addition, in a case where the complete reports of the instructions corresponding to all of the instruction data D held in the CSE-WINDOW 260 are issued, the instruction complete judging unit 270 controls the process that stores the next instruction data D from the CSE 240 and the CSE 242 to the CSE-WINDOW 260.

The instruction complete processor 280 outputs information for updating the PC or the like, based on at least one instruction data D that is output from the CSE-WINDOW 260 based on the complete report, and performs the instruction complete process.

FIG. 8 is a diagram illustrating an example of the CSE 240 and related circuits illustrated in FIG. 7. In FIG. 8, those elements that are the same as those corresponding elements in FIG. 7 are designated by the same reference numerals, and a detailed description thereof will be omitted. In FIG. 8, a group decode unit 243, a gate unit 244, and a selector unit (or circuit) 245D is provided in addition to the elements illustrated in FIG. 7.

The CSE 240 includes 4 column blocks CB (CB0 through CB3) corresponding to the decode slots DS (DS0 through DS3) illustrated in FIG. 6. In FIG. 8, the CSE-WINDOW 260 is illustrated in divisions, for each of the column blocks CB0 through CB3. Each column block CB includes 32 entries, and the group number GID is assigned for every 4 entries (one line) of the 4 column blocks CB, as illustrated in FIG. 10 which will be described later. The number within the entry of each column block CB indicates the IID assigned to the entry. Each entry is an example of the hold region to which the IID is assigned, and each column block CB is an example of a hold block corresponding to the decode slots DS.

For example, the 4 entries corresponding to IID=0, 1, 2, and 3 correspond to one group, and the 4 entries corresponding to IID=4, 5, 6, and 7 correspond to another group. Each group is identified by the group number GID which will be described later. For example, GID=0 indicates entries corresponding to IID=0, 1, 2, and 3, and GID=31 indicates entries corresponding to IID=124, 125, 126, and 127. Examples of IID and GID assignments of the CSE 240 are illustrated in FIG. 10.

The latch unit 250 includes a plurality of latches, and holds the instruction data D (D0 through D3) and the logical values of the release flags REL (REL0 through REL3) received in the D-cycle, in correspondence with the column blocks CB. The latches and the registers operate in synchronism with a clock signal, unless otherwise indicated, however, the illustration of the clock signal is omitted.

The group decode unit 243 includes a latch LT that holds, in the D-cycle, a 5-bit group number GID [4:0] output from the instruction decode unit 16, and a decoder GDEC. The decoder GDEC decodes, in the DT-cycle, the group number GID held by the latch LT, and sets one of 32 group selection signals GSEL0 through GSEL31 to a valid level. The 32 group selection signals GSEL correspond to the 32 groups of the CSE 240, respectively. Hence, the group decode unit 243 can select the entries to store the instruction data D, using the 5-bit GID, instead of using the 7-bit IID. For this reason, it is possible to reduce the circuit scale of the group decode unit 243 compared to the case where the IID is used.

The gate unit 244 includes 32 AND circuits for every column block CB. Each of the 32 AND circuits is receives one of the 32 group selection signals GSEL0 through GSEL31, and the release flag REL corresponding to the column block CB. The release flags REL0 through REL3 indicate whether the instruction data D0 through D3 are valid or invalid.

A clock enable signal CLKEN is output from the AND circuit corresponding to the group selection signal GSEL having the valid level. Accordingly, the clock signal is supplied to the entry corresponding to the clock enable signal CLKEN, and the instruction data D is stored in the entry. The entries not corresponding to the clock enable signal CLKEN do not receive the clock signal, and thus, these entries do not store the instruction data D. In other words, each column block CB, in a case where the corresponding release flag REL is valid, stores the received instruction data D in the entry indicated by the group selection signal GSEL. Each column block CB, in a case where the corresponding release flag REL is invalid, inhibits the storage of the received instruction data D.

The instruction complete judging unit 270 includes a commit judging unit (or circuit) 271, a selection signal generator 272, and a register 273. The commit register 271 judges whether to input the instruction data of the next entry (group) from the CSE 240 to each CSE-WINDOW 260, based on a commit signal CMT that indicates the commit state and is received from each CSE-WINDOW 260. The commit state of each CSE-WINDOW 260 refers to a state where information, corresponding to the instruction execution complete report, is set.

The commit judging unit 271 detects the instructions that are committable in order (that is, instructions having consecutive IIDs), based on the commit signals CMT. The commit judging unit 271 outputs a group commit signal GCMT in a case where all of the instructions held in the CSE-WINDOW 260 are in a committable state. In other words, when inputting the instruction data D of the next entry to each CSE-WINDOW part of the CSE-WINDOW 260, the commit judging unit 271 outputs the group commit signal GCMT to each CSE-WINDOW part of the CSE-WINDOW 260 and the register 273.

Each CSE-WINDOW part of the CSE-WINDOW 260 receives a clock enable signal CLKEN that is generated based on the group commit signal GCMT, and inputs the instruction data D that is being selected by a corresponding selector 246D which will be described later, at the CM1 cycle in synchronism with the clock signal. The group commit signal GCMT may be supplied to each CSE-WINDOW part of the CSE-WINDOW 260 as a clock enable signal. The operation of the instruction complete judging unit 270 will be described later in conjunction with FIG. 14 and FIG. 15.

The register 273 holds the group number CGID (GID) of the CSE 240 which held the instruction data D the CSE-WINDOW 260 holds. The register 273 updates the group number CGID based on the group commit signal GCMT. The selection signal generator 272 generates a group number by adding "1" to the group number CGID, and decodes the generated group number, to set one of 32 next group selection signals NGSEL0 through NGSEL31 to a valid level. The next group selection signals NGSEL0 through NGSEL31 correspond to the 32 groups of the CSE 240, respectively. The next group selection signal NGSEL that is set to the valid level indicates the group number of the instruction data D that is stored next in each CSE-WINDOW part of the CSE-WINDOW 260. The group number CGID is cyclically generated, from "0" to "31".

The selector unit 245D includes selectors 246D (32:1) corresponding to each of the column blocks CB, respectively. Each selector 246D receives the instruction data D of 32 groups held in the Corresponding column block CB, and the 32 next group selection signals NGSEL0 through NGSEL31. Each selector 246D selects the instruction data D corresponding to the next group selection signal NGSEL having the valid level, and outputs the selected instruction data D to the corresponding CSE-WINDOW part of the CSE-WINDOW 260. The selector 246D is an example of a selector that selects the instruction data D held by the plurality of entries of the corresponding column block CB based on the group number GID, and outputs the selected instruction data D to the corresponding CSE-WINDOW part of the CSE-WINDOW 260.

A 8:1 selector that selects one input from 8 inputs, and a 4:1 selector that selects one input from 4 inputs, may be provided in place of each selector 246D. Alternatively, a 8:1 selector that selects one input from 8 inputs, and two 2:1 selectors that select one input from 2 inputs, respectively, may be provided in place of each selector 246D.

The column blocks CB0 through CB3 are provided in correspondence with the decode slots DS of the instruction decode unit 16, illustrated in FIG. 6. For this reason, the instruction data D0 output from the decode slot DS0, for example, is stored only in the column block CB0, and is not stored in the column blocks CB1 through CB3. Accordingly, the instruction data D0 can be stored in the CSE 240, without providing transfer routes (interconnections) for transferring the instruction data D0, stored in the latch of the latch unit 250, to each of the column blocks CB1 through CB3. In addition, the instruction data can be stored in the CSE 240, without providing a switching unit, such as a selector or the like, for selecting the instruction data D0 through D3 in correspondence with each of the column blocks CB0 through CB3.

Furthermore, one instruction data D0 is stored only in one column block CB, and is not stored in the other column blocks CB. Hence, each selector 246D need only select 32 instruction data D of the corresponding column block CB, and supply the selected instruction data D to the corresponding CSE-WINDOW part of the CSE WINDOW 260. In other words, each selector 246D does not need to select the 128 instruction data D of the 4 column blocks CB0 through CB3. Accordingly, the instruction data D can be stored in the CSE-WINDOW 260 without providing the transfer routes (interconnections) for transferring the instruction data D from the column blocks CB1 through CB3 to each selector 246D, and the increase of the circuit scale of the selector 246D can be reduced.

Figure 9:
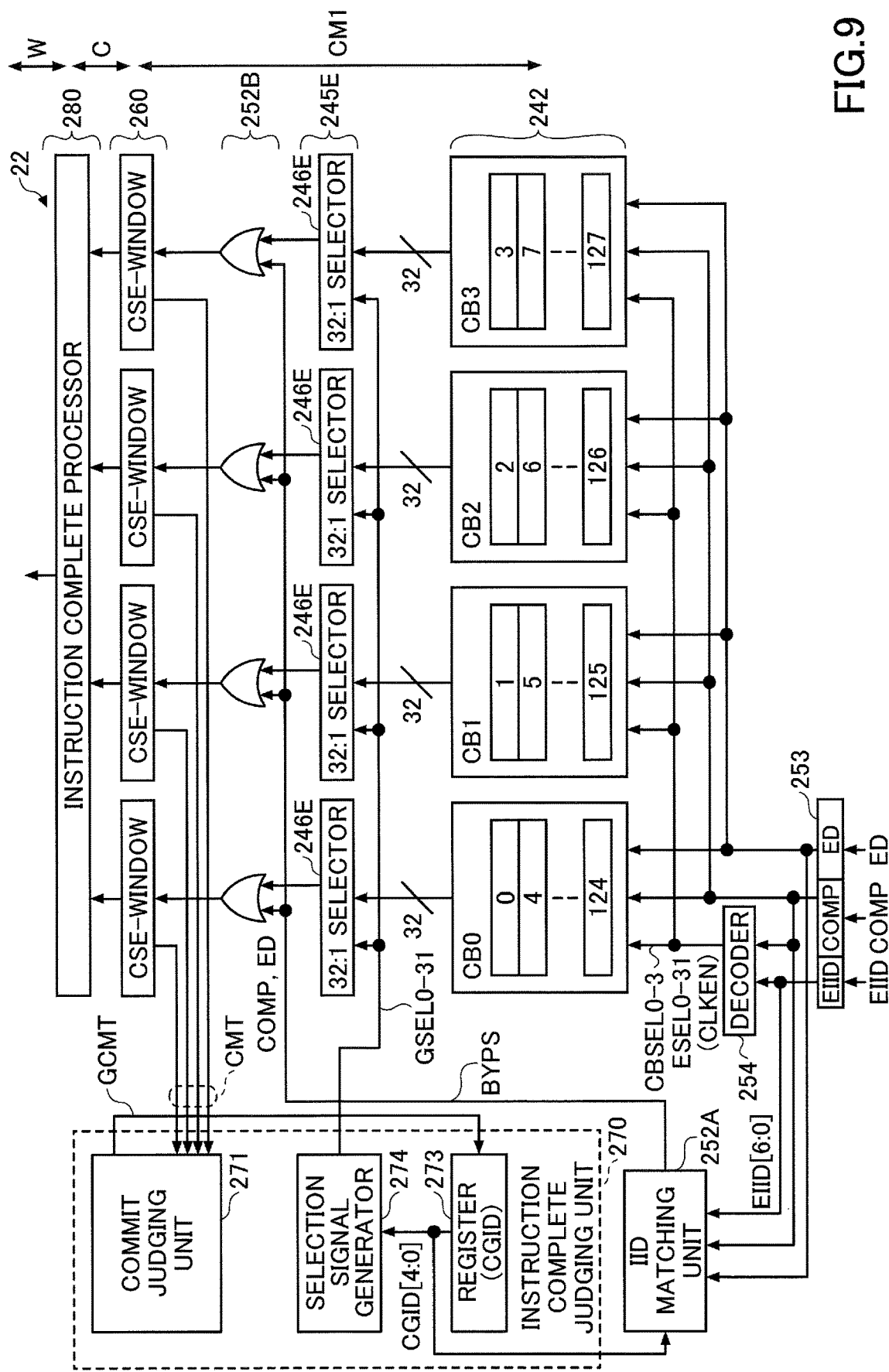
FIG. 9 is a diagram illustrating an example of a CSE 242 and related circuits illustrated in FIG. 7.

FIG. 9 is a diagram illustrating an example of the CSE 242 and related circuits illustrated in FIG. 7. In FIG. 9, those elements that are the same as those corresponding elements in FIG. 7 and FIG. 8 are designated by the same reference numerals, and a detailed description thereof will be omitted. The CSE-WINDOW 260 and the instruction complete processor 280, and the commit judging unit 271 and the register 273 within the instruction complete judging unit 270, are common to the circuits illustrated in FIG. 8. Column blocks CB0 through CB3 of the CSE 242 are physically different circuits from the column blocks CB0 through CB3 of the CSE 240.

In FIG. 9, a description will be given of a case where the complete report is received from the computing unit 40, however, a similar operation is performed also with respect to complete reports received from the computing unit 42, the primary data cache 38, the RSBR 204, or the like. In addition to the elements illustrated in FIG. 7, the CSE 242 and the related circuits illustrated in FIG. 9 include a latch unit 253, a decoder 254, an IID matching unit (or circuit) 252A, a selector unit (or circuit) 245E, and an OR unit 252B.

The latch unit 253 receives, out of order, a complete report COMP, and data ED from the computing unit 40. The data ED indicates the IID (EIID: 7 bits), the condition code, exception, or the like. The complete report COMP is both data and a valid flag indicating that the EIID is valid. The complete report COMP is an example of complete report information.

The decoder 254 decides the EIID in a case where the complete report COMP is received. In addition, the decoder 254 generates 4 selection signals CBSEL (CBSEL0 through CBSEL3) from lower 2 bits of the EIID, and generates 32 selection signals ESEL (ESEL0 through ESEL31) from the upper 5 bits of the EIID.

One of the column blocks CB is selected by the selection signal CBSEL. The selection signal ESEL is supplied to each column block CB as the clock enable signal CLKEN, and the complete report COMP and the data ED are stored in one of the entries within the column block CB that is selected by the selection signal CBSEL, in synchronism with the clock signal. Hence, the complete report COMP and the data ED are registered in one entry of the CSE 242 for every one cycle.

The storage of the complete report COMP to the CSE 242 is performed based on the IID, and not based on the GID. Accordingly, the instruction decode unit 16 can issue the IID, without issuing the GID to the computing units 40 and 42 or the like, and the processing device 102 can be designed using existing circuits including the reservation station 20.

The IID matching unit 252A and the OR unit 252B function as the bypass controller 252 illustrated in FIG. 7. In a case where the complete report COMP is set in the IID matching unit 252A and the GID to which the EIID belongs and a current CGID (=GID) match, the IID matching unit 252A outputs the complete report COMP and the data ED to one of OR circuits of the OR unit 252B corresponding to the EIID. The GID is represented by the upper 5 bits of the 7-bit EIID[6:0], and the column block CB is represented by the lower 2 bits of the 7-bit EIID[6:0]. An interconnection BYPS connecting between the IID matching unit 252A and the OR unit 252B, is an example of a bypass route.

Accordingly, the complete report COMP and the data ED are set in the CSE-WINDOW 260 corresponding to the EIID, and the complete process can be started without waiting for the complete report COMP from the column blocks CB0 through CB3. In other words, a bypass function of the complete report COMP and the data ED can be can be achieved. The information stored in the latch unit 253 is stored in the target column blocks CB0 through CB3, regardless of the operation of the IID matching unit 252A. The IID matching unit 252A is an example of a judging unit (or circuit), that judges whether the group number CGID corresponding to the EIID matches the group number GID corresponding to the instruction data D held in the CSE-WINDOW 260, based on the reception of the complete report COMP and the EIID.

The group commit signal GCMT (used as the clock enable signal CLKEN) output from the commit judging unit 271 is supplied to the register 273, but is not supplied to the CSE-WINDOW 260. For this reason, each CSE-WINDOW part of the CSE-WINDOW 260 inputs, for every cycle, regardless of the group commit signal GCMT, the complete report COMP and the data ED being selected by the selector 246E, or the complete report COMP and the data ED output from the IID matching unit 252A.

The selection signal generator 274 generates the group number by adding "1" to the group number CGID. The selection signal generator 274 decodes the generated group number, or the group number CGID, to set one of the 32 group selection signals GSEL0 through GSEL 31 to the valid level. The group selection signals GSEL0 through GSEL31 correspond to the 32 groups of the CSE 240, respectively, and the group selection signal GSEL that is set to the valid level indicates the group number of the complete report COMP and the data ED stored in the CSE-WINDOW 260. In a case where the group number CGID is "31", the group number that is generated by adding "1" is "0".

The selector unit 245E includes a selector 246E (32:1) corresponding to each column block CB. Each selector 246E receives the complete report COMP and the data ED of the 32 groups held in the corresponding column block CB, and the 32 group selection signals GSEL0 through GSEL31. Each selector 246E selects the complete report COMP and the data ED corresponding to the group selection signal GSEL having the valid level, and outputs the selected complete report COMP and data ED to the corresponding CSE-WINDOW part of the CSE-WINDOW 260.

A 8:1 selector that selects one input from 8 inputs, and a 4:1 selector that selects one input from 4 inputs, may be provided in place of each selector 246E. Alternatively, a 8:1 selector that selects one input from 8 inputs, and two 2:1 selectors that select one input from 2 inputs, respectively, may be provided in place of each selector 246E.

Because each CSE-WINDOW part of the CSE-WINDOW 260 requires overwriting the complete report COMP and the data ED that are already set, the complete report COMP and the data ED are input from the CSE 240 for every cycle. The group, holding the complete report COMP and the data ED that are input, differs depending on whether the group selection signal GSEL indicates the current GID or the next GID.

The OR unit 252B includes the OR circuits corresponding to each of the bits of the complete report COMP and the data ED, for every column block CB. The OR unit 252B outputs the complete report COMP and the data ED output from the selectors 246E, or the complete report COMP and the data ED output from the IID matching unit 252A, to the CSE-WINDOW 260. In a case where the OR unit 252B receives the complete report COMP from the IID matching unit 252A, the OR unit 262B preferentially outputs the data ED received from the IID matching unit 252A to the CSE-WINDOW 260.

FIG. 10 is a diagram illustrating an example of IID assignments of the CSE 240 and the CSE 242 illustrated in FIG. 7. The CSE 240 and the CSE 242 have similar structures, except for the size of each entry and the information that is registered, and for this reason, a description will hereinafter be given of the CSE 240. The CSE 240 includes 32 group regions assigned the group numbers GID of "0" through "31". Each group region includes 4 entries corresponding to the 4 decode slots DS, respectively. Each entry holds the instruction data D that is the decoded result of one instruction, or the like. In other words, the CSE 240 includes 128 entries that hold the instruction data D.

The IID whose number increases by "1" from the column block CB0 through the column block CB3 is assigned to each entry. The numerical value within each entry illustrated in FIG. 10 indicates the IID. The IID assigned to the column block CB0 is a value that is obtained by multiplying 4 to the group number GID, and the IID assigned to the column block CB1 is a value that is obtained by multiplying 4 to the group number GID and adding "1". The IID assigned to the column block CB2 is a value that is obtained by multiplying 4 to the group number GID and adding "2", and the IID assigned to the column block CB3 is a value that is obtained by multiplying 4 to the group number GID and adding "3".

In the CSE 240 illustrated in FIG. 10, the instruction data D of the instruction that is decoded by the decode slot DS0, is stored in the column block CB0, and the instruction data D of the instruction that is decoded by the decode slot DS1, is stored in the column block CB1. The instruction data D of the instruction that is decoded by the decode slot DS2, is stored in the column block CB2, and the instruction data D of the instruction that is decoded by the decode slot DS3, is stored in the column block CB3. Accordingly, the instruction data D of the instruction that is decoded by the decode slot DS0 is not stored in the column blocks CB1 through CB3, and the number of transfer routes (interconnections) for transferring the instruction data D can be reduced, to reduce the increase of the circuit scale.

FIG. 11 is a diagram illustrating an example of assignments of instruction data or the like stored in the CSE 240 illustrated in FIG. 8 and the CSE 242 illustrated in FIG. 9. FIG. 11 illustrates an example of the method of controlling the processing device 102. The numerical values in the table illustrated in FIG. 11 indicate the IID. In this embodiment, the instruction data D of the instructions decoded by the decode slots DS0 through DS3 are stored in the column blocks CB0 through CB3, respectively. The instruction decode unit 16 generates the IID to notify the computing units 40 and 42 or the like, but the IID is not notified to the CSE 240, and the group number GID is notified to the CSE 240 in place of the IID.

The assignment of the instruction data D to the CSE 240 is performed in the D-cycle by the instruction decode unit 16, and the instruction data D is stored in the CSE 240 in the DT-cycle based on the assignment. For example, in a first cycle, the instruction decode unit 16 decodes the instructions, and assigns, in order, the group number GID=0 to the 4 instruction data D that are obtained by the decoding. Hence, the IID can be assigned to a maximum of 4 instructions for every decode cycle.

In a second cycle, the instruction decode unit 16 assigns the group number GID=1 to the 3 instruction data D that are obtained by the decoding. On the other hand, because no instruction is assigned to the decode slot DS3, the decoding is reserved. No instruction may be assigned because no instruction is received from the instruction buffer 14, or because the issuance of the instruction is inhibited due to a dependence to a previous instruction, for example.

In a third cycle, the instruction decode unit 16 decodes, in order, the 4 instructions including the instruction not assigned in the second cycle, and assigns the group number GID=2 to the 4 instruction data D that are obtained by the decoding. In this case, the instruction decode unit 16 regards the IID=7 that is not assigned in the second cycle as an unused (or unobtainable) number, and assigns the IID=8 through IID=11 to the instruction data D in the third cycle. As a result, as described above in conjunction with FIG. 10, the IIDs assigned to each of the decode slots DS can be a multiple of 4 plus a predetermined increment. Consequently, it is possible to reduce an increase of the number of interconnections connected to the CSE 240 and the CSE 242, to reduce the increase of the circuit scale.

In a fourth cycle, the instruction decode unit 16 assigns the group number GID=3 to the 4 instruction data D that are obtained by the decoding. In addition, the instruction decode unit 16 waits for the allocation of the resources used for the instructions, or the like, and cannot issue the instructions corresponding to IID=14 and IID=15. Hence, the issuance of these instructions by the instruction decode unit 16 is reserved, as indicated in round brackets, and the group number GID is not updated.

In a fifth cycle, the instruction decode unit 16 redecodes the instructions held in the fourth cycle (corresponding to IID=14 and IID=15), while maintaining the group number GID to "3". In this case, the instruction decode unit 16 decodes the instructions having the IID=14 and IID=15 reassigned to the same decode slots DS2 and DS3 as the fourth cycle.

In other words, the instruction assigned IID=14 is decoded by the decode slot DS2, and not by the decode slot DS0. In addition, the instruction assigned IID=15 is decoded by the decode slot DS3, and not by the decode slot DS1. Hence, the instructions assigned IID=14 and IID=15 are stored in the entries of the column blocks CB2 and CB3 where these instructions should have been stored in the third cycle. Accordingly, the instruction data D can be stored in the CSE 240, without providing interconnections for transferring the instruction data D from the decode slot DS0 to the column block CB2 nor a selector for switching the transfer routes. As a result, it is possible to reduce an increase of the number of interconnections connected to the CSE 240, to reduce the increase of the circuit scale.

In a sixth cycle, the instruction decode unit 16 assigns the group number GID=4 to the 3 instruction data D that are obtained by the decoding, similar to the second cycle. In this case, the instruction decode unit 16 regards IID=19, corresponding to the decode slot DS3, as an unused (or unobtainable) number. In a seventh cycle, the instruction decode unit 16 assigns the group number GID=5 to the 2 instruction data that are obtained by the decoding, similar to the second cycle. In this case, the instruction decode unit 16 regards IID=20 and IID=23 respectively corresponding to the decode slots DS0 and DS3, as unused (or unobtainable) numbers. A eighth cycle is similar to the second cycle.

The assignment of the complete report COMP, the data ED, or the like to the CSE 242 is similar to the assignment with respect to the CSE 240, except that the assignment is performed for every instruction based on the IID and the complete report COMP from the computing unit 40 or the like.

FIG. 12 is a diagram illustrating an example of assignments of instruction data or the like stored in the CSE-WINDOW 260 illustrated in FIG. 8 and FIG. 9. FIG. 12 illustrates an example of the method of controlling the processing device 102. The numerical values in the table illustrated in FIG. 12 indicate the IID. A symbol (C) in the table indicates a state (committed state) where the complete report of the corresponding instruction is issued, and an element without the symbol (C) indicates that the complete report of the corresponding instruction is not issued. The "C" in the group commit column indicates that all of the instruction data D stored in the CSE-WINDOW 260 are committed, in correspondence with one group number GID. The instructions stored in the CSE-WINDOW 260 are committed in the C-cycle by the instruction complete controller 22.

In this embodiment, the IID, assigned to the instruction data D or the like stored in the CSE 240 during the DT-cycle, is inherited as it is for the IID assignment of the CSE-WINDOW 260. In other words, the assignment illustrated in FIG. 12 is the same as the assignment illustrated in FIG. 11.

In the first cycle, each instruction having the group number GID=0 is committed, and the commit of the group 0 is satisfied. For this reason, 3 instruction data D or the like assigned the group number GID=1 are stored from the CSE 240 to the CSE-WINDOW 260.

In the second cycle, each instruction having the group number GID=1 is committed, and the commit of the group 1 is satisfied. For this reason, 4 instruction data D or the like assigned the group number GID=2 are stored from the CSE 240 to the CSE-WINDOW 260.

In the third cycle, among the instructions having the group number GID=2, 2 instructions respectively corresponding to IID=8 and IID=9 are committed, however, 2 instructions respectively corresponding to IID=10 and IID=11 are not committed. Hence, the commit of the group 2 is not satisfied. For this reason, the instruction complete judging unit 270 illustrated in FIG. 8 does not update the group number GID, and waits until the 2 instructions respectively corresponding to IID=10 and IID=11 are committed.

In the fourth cycle, the 2 instructions respectively corresponding to IID=10 and IID=11 are committed, and the commit of the group 2 is satisfied. Hence, the 4 instruction data D or the like assigned the group number GID=3 are stored from the CSE 240 to the CSE-WINDOW 260. Thereafter, the assignment of the fifth and subsequent cycles are performed, similar to the first cycle or the third cycle.

As illustrated for the third and fourth cycles, in the case where one of the instructions assigned the IID corresponding to the group number GID is not committed, the instruction complete controller 22 does not update the group number GID, and judges, in the next cycle, whether the instruction that is not committed is committed in this next cycle. Hence, a commit judging process can be performed without setting the instruction data D corresponding to IID=10 and IID=11 again in the CSE-WINDOW 260, and the operation to set the instruction data D to the CSE-WINDOW 260 can be performed in a simple manner.

In FIG. 12, the IIDs assigned to each of the decode slots DS can also be the multiple of 4 plus the predetermined increment. Consequently, it is possible to reduce the increase of the number of interconnections connected between the CSE 240 and the CSE-WINDOW 260, to reduce the increase of the circuit scale.

Figure 13:
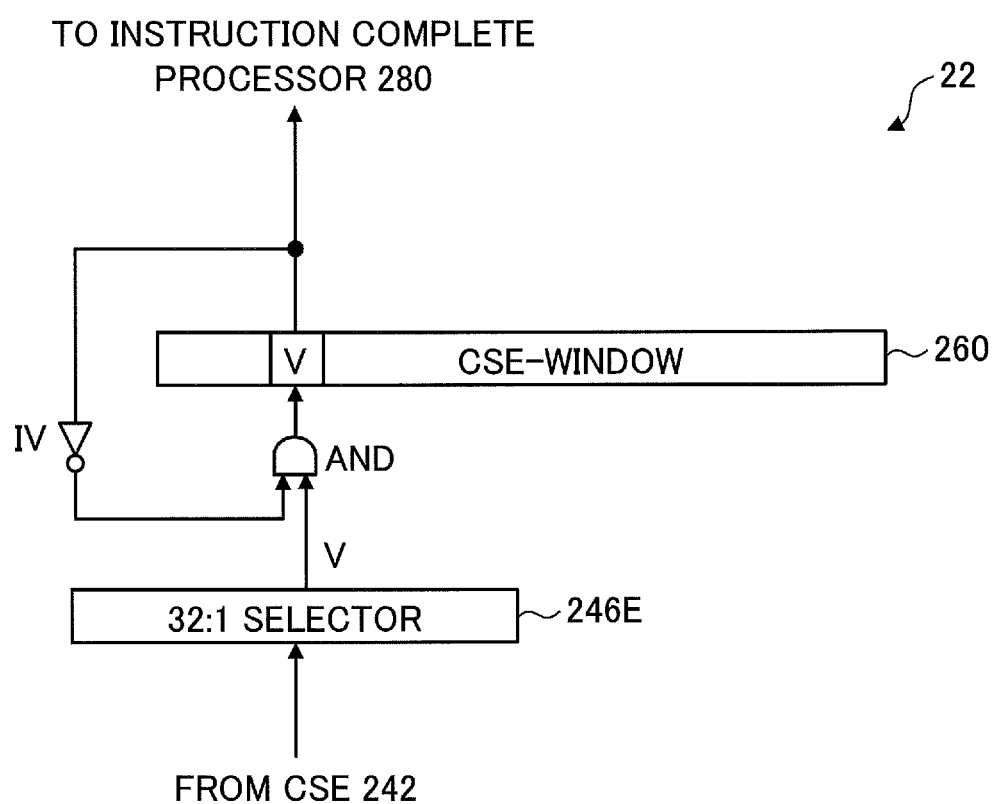
FIG. 13 is a diagram illustrating an example of a circuit that invalidates information within the CSE-WINDOW corresponding to committed instruction, in a case where a group commit is not satisfied.

FIG. 13 is a diagram illustrating an example of a circuit that invalidates information within the CSE-WINDOW 260 corresponding to committed instruction, in a case where a group commit is not satisfied. FIG. 13 illustrates the CSE-WINDOW 260 corresponding to the CSE 242.

For example, the valid flag V indicating whether the information to be stored in the CSE-WINDOW 260 is valid or invalid, and having the logical value "1" when indicating valid, is stored in the CSE-WINDOW 260 via an AND circuit AND. The logical value of the valid flag V stored in the CSE-WINDOW 260 is inverted via an inverter IV, and is input to the AND circuit AND. Hence, after the valid flag V having the logical value "1" is once set in the CSE-WINDOW 260, the valid flag V of the CSE-WINDOW 260 is maintained to the logical value "0".

Accordingly, in a case where some of the plurality of instruction data D or the like held in the CSE-WINDOW 260 remains without being committed, it is possible to inhibit the instruction data D or the like committed before from being committed again. For example, in the fourth cycle illustrated in FIG. 12, it is possible to inhibit the 2 instructions, committed before in the third cycle, from being committed again, and an erroneous operation of the processing device 102 can be inhibited.

Figure 14:
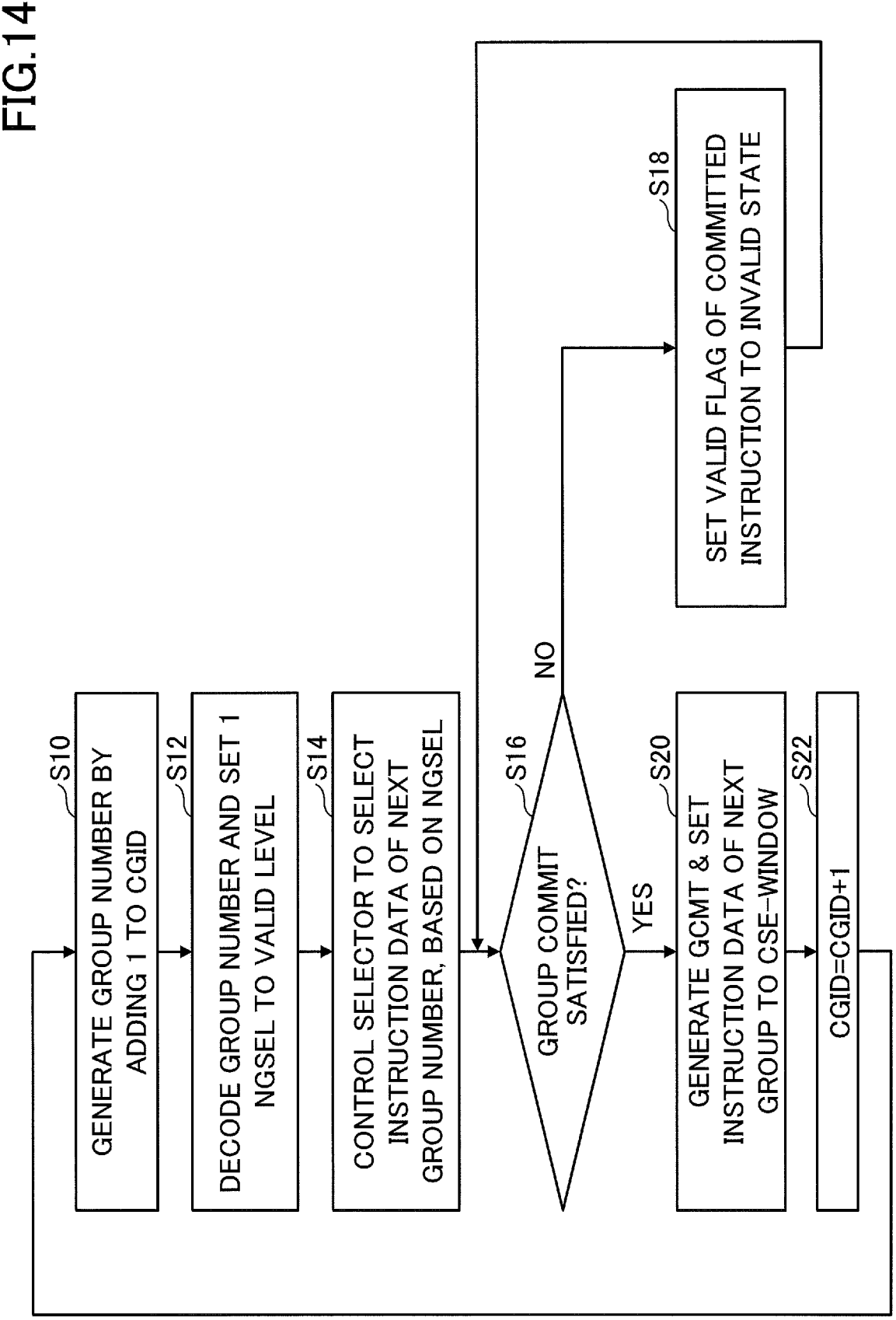
FIG. 14 is a diagram illustrating an example of an operation to set the CSE-WINDOW based on decoding of instruction.

FIG. 14 is a diagram illustrating an example of an operation to set the CSE-WINDOW 260 based on decoding of instruction. FIG. 14 illustrates an example of the method of controlling the processing device 102. A process flow illustrated in FIG. 14 is repeatedly performed by the instruction complete judging unit 270 or the like illustrated in FIG.

Figure 15:
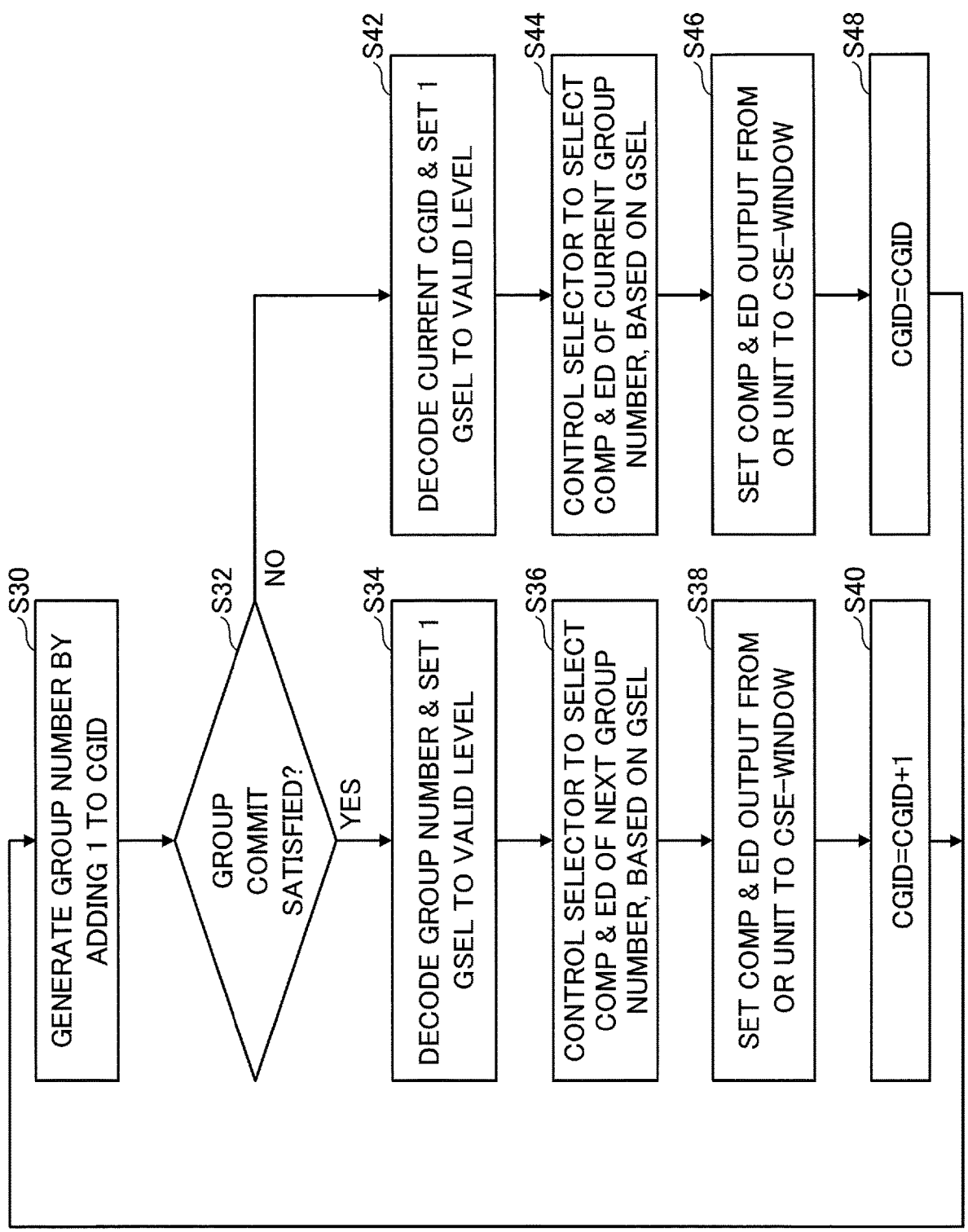
FIG. 15 is a diagram illustrating an example of an operation to set the CSE-WINDOW based on an instruction complete report.

8. An example of an operation to set the CSE-WINDOW 260 based on the instruction complete report is illustrated in FIG. 15.

First, in step S10, the selection signal generator 272 illustrated in FIG. 8 generates the group number that is obtained by adding "1" to the group number CGI. The group number indicates the entry where the instruction data D or the like to be read next from the CSE 240 is held. Next, in step S12, the selection signal generator 272 decodes the group number generated in step S10, and sets one of the next group selection signals NGSEL0 through NGSEL31 to the valid level.

Next, in step S14, the instruction complete judging unit 270 controls the selector 245 to select the instruction data D or the like of the next group number GID, based on the next group selection signal NGSEL that is set to the valid level. Next, in step S16, the commit judging unit 271 illustrated in FIG. 8 moves the operation to step S20 in a case where the group commit is satisfied. On the other hand, in a case where the group commit is not satisfied, that is, in a case where execution of one of the instructions corresponding to the instruction data D set in the CSE-WINDOW 260 is not completed, the commit judging unit 271 moves the operation to step S18. For example, the group commit is satisfied in each of the first cycle, the second cycle, the fourth cycle, the fifth cycle, the seventh cycle, and the eighth cycle illustrated in FIG. 12, and the operation moves to step S20. The group commit is not satisfied in each of the third cycle, the sixth cycle, and the ninth cycle illustrated in FIG. 13, and the operation moves to step S18.

In step S18, the inverter IV and the AND circuit AND illustrated in FIG. 13 set the valid flag V, held in the CSE-WINDOW 260 in correspondence with the committed instruction, to the invalid state (logical value "0"), and returns the operation to step S16. For example, in the third cycle illustrated in FIG. 12, the instructions corresponding to the IID=8 and IID=9 are committed, and the instruction data D or the like corresponding to IID=8 and IID=9 are set to the invalid state. In step S18, the group number GID is not updated, and the transfer of the instruction data D from the CSE 240 to the CSE-WINDOW 260 is inhibited.

In the case where the group commit is satisfied, the commit judging unit 271, in step S20, generates the group commit signal GCMT to be output to the CSE-WINDOW 260 corresponding to the CSE 240. Hence, the instruction data D of the next group number GID selected by the selector unit 245D is set in the CSE-WINDOW 260. In other words, in the case where the group commit is satisfied, the group number GID corresponding to the instruction data D set in the CSE-WINDOW 260 is updated.

Next, in step S22, the register 273 updates the group number CGID based on the group commit signal GCMT, and outputs the next group number GID. Thereafter, the operation returns to step S10.

FIG. 15 is a diagram illustrating an example of an operation to set the CSE-WINDOW 260 based on an instruction complete report. FIG. 15 illustrates an example of the method of controlling the processing device 102. A process flow illustrated in FIG. 15 is repeatedly performed by the instruction complete judging unit 270 illustrated in FIG. 9.

First, in step S30, the selection signal generator 274 illustrated in FIG. 9 generates a group number by adding "1" to the group number CGID. The group number indicates the entry that holds the complete report COMP and the data ED to be read next from the CSE 242. The operation in step S30 is similar to the operation in step S10 illustrated in FIG. 14.

Next, in step S32, the commit judging unit 271 illustrated in FIG. 9 moves the operation to step S34 in a case where the group commit is satisfied, and moves the operation to step S42 in a case where the group commit is not satisfied. The operation in step S32 is similar to the operation in step S16 illustrated in FIG. 14.

In step S34, the selection signal generator 274 decodes the group number generated in step S30, and sets one of the group selection signals GSEL0 through GSEL31 to the valid level. The operation in step S34 is similar to the operation in step S12 illustrated in FIG. 14.

Next, in step S36, the instruction complete judging unit 270 controls the selector unit 245E to select the complete report COMP, the data ED, or the like of the next group number GID, based on the group selection signal GSEL that is set to the valid level. The operation in step S36 is similar to the operation in step S14 illustrated in FIG. 14.

Next, in step S38, the CSE-WINDOW 260 corresponding to the CSE 242 sets the complete report COMP and the data ED output from the OR unit 252B. Next, in step S40, the register 273 updates the group number CGID based on the group commit signal GCMT generated in step S20 illustrated in FIG. 14, and outputs the next group number GID. Thereafter, the operation returns to step S30. For the sake of convenience to facilitate understanding of the operation, the operation in step S40 is illustrated as a duplicate of the operation in step S22 illustrated in FIG. 8, however, it does not mean that each of step S22 illustrated in FIG. 8 and step S40 illustrated in FIG. 9 is performed.

On the other hand, in the case where the group commit is not satisfied, the selection signal generator 274, in step S42, decodes the current CGID, and sets one of the group selection signals GSEL0 through GSEL31 to the valid level. In other words, the CGID (GID) is not updated. Next, in step S44, the instruction complete judging unit 270 controls the selector unit 245E to select the complete report COMP, the data ED, or the like of the current group number GID, based on the group selection signal GSEL that is set to the valid level.

Next, in step S46, the CSE-WINDOW 260 corresponding to the CSE 242 sets the complete report and the data ED output from the OR unit 252B. As a result, the complete report COMP that is newly generated can be set from the CSE 242 to the CSE-WINDOW 260, in correspondence with each of the column blocks CB0 through CB3. In this case, by using the group selection signals GSEL0 through GSEL31 common to the 4 selectors 246E, the structure of the circuit that sets the complete report COMP to the CSE-WINDOW 260 can be made simple compared to the structure of a circuit illustrated in FIG. 16 which will be described later. Next, in step S48, the register 273 does not update the group number CGID because the register 273 does not receive the group commit signal GCMT, and the operation returns to step S30.

Figure 16:
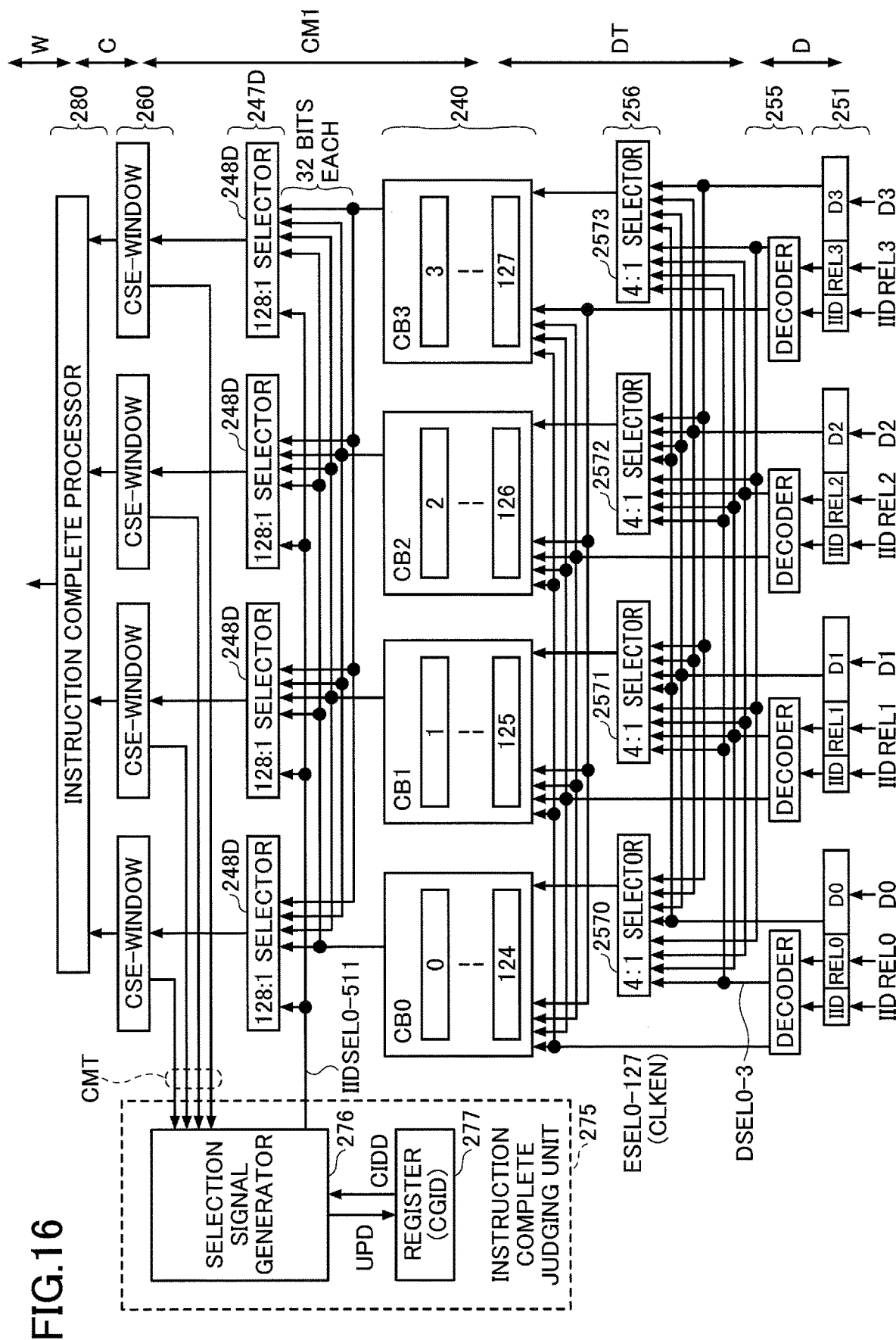
FIG. 16 is a diagram illustrating an example of the CSE 240 and the related circuits of another instruction complete controller.

FIG. 16 is a diagram illustrating an example of the CSE 240 and the related circuits of another instruction complete controller. In FIG. 16, those parts that are the same or similar to those corresponding parts in FIG. 8 are designated by the same reference numerals, and a detailed description thereof will be omitted.

The instruction complete controller illustrated in FIG. 16 includes a latch unit 251, a decoder unit 255, a selector unit (or circuit) 256, the CSE 240, a selector unit (or circuit) 247D, the CSE-WINDOW 260, the instruction complete processor 280, and an instruction complete judging unit 275.

The CSE 240, the CSE-WINDOW 260, and the instruction complete processor 280 are the same those illustrated in FIG. 9.

The latch unit 251 is similar to the latch unit 250 illustrated in FIG. 8, except that a circuit is added to latch the IID received from the instruction decode unit 16. In the following description, the latch included in the latch unit 251 may also be referred to as a latch 251. Each of 4 decoders of the decoder unit 255 decodes the IID and determines the entry of the CSE 240 where the instruction data D is to be stored, in the case where the release flag REL is valid. The 4 decoders of the decoder unit 255 generate selection signals DSEL (DSEL0 through DSEL3), respectively, and selection signals ESEL (ESEL0 through ESEL127), for storing the instruction data D in the determined entry.

The selection signals DSEL0 through DSEL3 generated from the decoder unit 255 are supplied to each of 4 selectors 257 (2570 through 2573) of the selector unit 256. For example, each selector 257 receives the 4 selection signals DSEL output from the decoder unit 255 by an OR circuit, and selects one of the instruction data D0 through D3 based on the selection signal DSEL output from this OR circuit.

The selection signals ESEL0 through ESEL127 generated from the decoder unit 255 are supplied to the column blocks CB0 through CB3 in groups of 32 selection signals ESEL, respectively. The selection signals ESEL0 through ESEL127 correspond to the IID number, and correspond to the 128 entries of the CSE 240, respectively. Each of the column blocks CB0 through CB3 receives the 4 selection signals DSEL output from the decoders of the decoder unit 255 by an OR circuit, and generates the clock enable signal CLKEN based on the selection signal DSEL that is output from this OR circuit. The 4 selection signals DSEL are the selection signals ESEL having a last digit that is the same number (for example, 4 selection signals ESEL0). The clock signal is supplied to the entry corresponding to the generated clock enable signal CLKEN, and one of the instruction data D0 through D3 is stored in the entry indicated by the selection signal ESEL in synchronism with the clock signal.

For example, in a case where the latch 251, corresponding to the decode slot DS0 illustrated in FIG. 6 and outputting the instruction data D0, latches the instruction data D0 and IID=1, the selector 2570 selects the instruction data D0 based on the selection signal DSEL0. The column block CB0 stores the instruction data D0 selected by the selector 2570 in the entry that is assigned IID=0, based on the selection signal ESEL0.

In addition, in a case where the latch 251, corresponding to the decode slot DS0 and outputting the instruction data D0, latches the instruction data D0 and IID=2, the selector 2572 selects the instruction data D0 based on the selection signal DSEL2. The column block CB2 stores the instruction data D0 selected by the selector 2572 in the entry that is assigned IID=2, based on the selection signal ESEL2.

Similarly, in a case where the latch 251, corresponding to the decode slot DS3 and outputting the instruction data D3, latches the instruction data D3 and IID=8, the selector 2570 selects the instruction data D3 based on the selection signal DSEL3. The column block CB0 stores the instruction data D3 selected by the selector 2570 in the entry that is assigned IID=8, based on the selection signal ESEL124.

According to FIG. 16, the instruction data D output from the decode slots DS0 through DS3 is storable in any of the column blocks CB0 through CB3. For this reason, "(128+4)×4" interconnections for the selection signals are provided to transfer the instruction data D from the latch 251 to the column blocks CB0 through CB3 at the storage destination.

In addition, interconnections are provided to supply each of the instruction data D0 through D3, made up of several tens of bits, to the selectors 257. Further, the circuit scale of the circuit that stores the instruction data D0 to the CSE 240 is large compared to the circuit scale illustrated in FIG. 8.

The instruction complete judging unit 275 includes a selection signal generator 276, and a register 277 that stores the IID (CIDD). The selection signal generator 276 receives the commit signals CMT from the 4 CSE-WINDOW parts of the CSE-WINDOW 260, and outputs an update signal UPD indicating a predetermined increment corresponding to the number of commit signals CMT received from the CSE-WINDOW 260. The update signal UPD is output to the register 277, and the selection signal generator 276 receives the CIDD updated by the register 277. The selection signal generator 276 generates selection signals IIDSEL (IIDSEL0 through IIDSEL511) for selecting the instruction data D to be set next in the CSE-WINDOW 260, based on the updated CIDD. The 512 selection signals IIDSEL are supplied to 4 selectors 248D of the selector unit 247D, in groups of 128 selection signals IIDSEL. Hence, it is possible to store the instruction data D corresponding to 4 arbitrary consecutive IIDs to the 4 CSE-WINDOW parts of the CSE-WINDOW 260.

For example, in a case where the register 277 outputs CIDD=2, the selection signal generator 276 generates the selection signal IIDSEL for causing the first selector 248D from the left to select the entry of the column block CB2 assigned IID=2. The selection signal generator 276 generates the selection signal IIDSEL for causing the second selector 248D from the left to select the entry of the column block CB3 assigned IID=3. The selection signal generator 276 generates the selection signal IIDSEL for causing the third selector 248D from the left to select the entry of the column block CB0 assigned IID=4. Further, the selection signal generator 276 generates the selection signal IIDSEL for causing the fourth selector 248D from the left to select the entry of the column block CB1 assigned IID=5.

In FIG. 16, 512 interconnections for the selection signals IIDSEL are provided, and interconnections are provided to transfer the instruction data D made up of several tens of bits from each of the entries of the 4 column blocks CB0 through CB3 to the 4 selectors 248D. Accordingly, the instruction data D held by each of the entries of the CSE 240 can be stored in any of the 4 CSE-WINDOW parts of the CSE-WINDOW 260. However, the circuit scale required to read the instruction data D0 to the CSE-WINDOW 260 is large compared to the circuit scale illustrated in FIG. 8.

In other words, in FIG. 8, the column blocks CB0 through CB3 are provided in correspondence with the decode slots DS0 through DS3, and the unused (or unobtainable) number is permitted for the IID. For this reason, each of the decode slots DS0 through DS3 need only generate the IID from the multiple of 4 plus the predetermined increment. Consequently, no interconnection is required to store the instruction data D to and obtain the instruction data D from an arbitrary one of the column blocks CB0 through CB3, and the circuit scale of the instruction complete controller 22 can be reduced compared to the circuit scale illustrated in FIG. 16.

Figure 17:
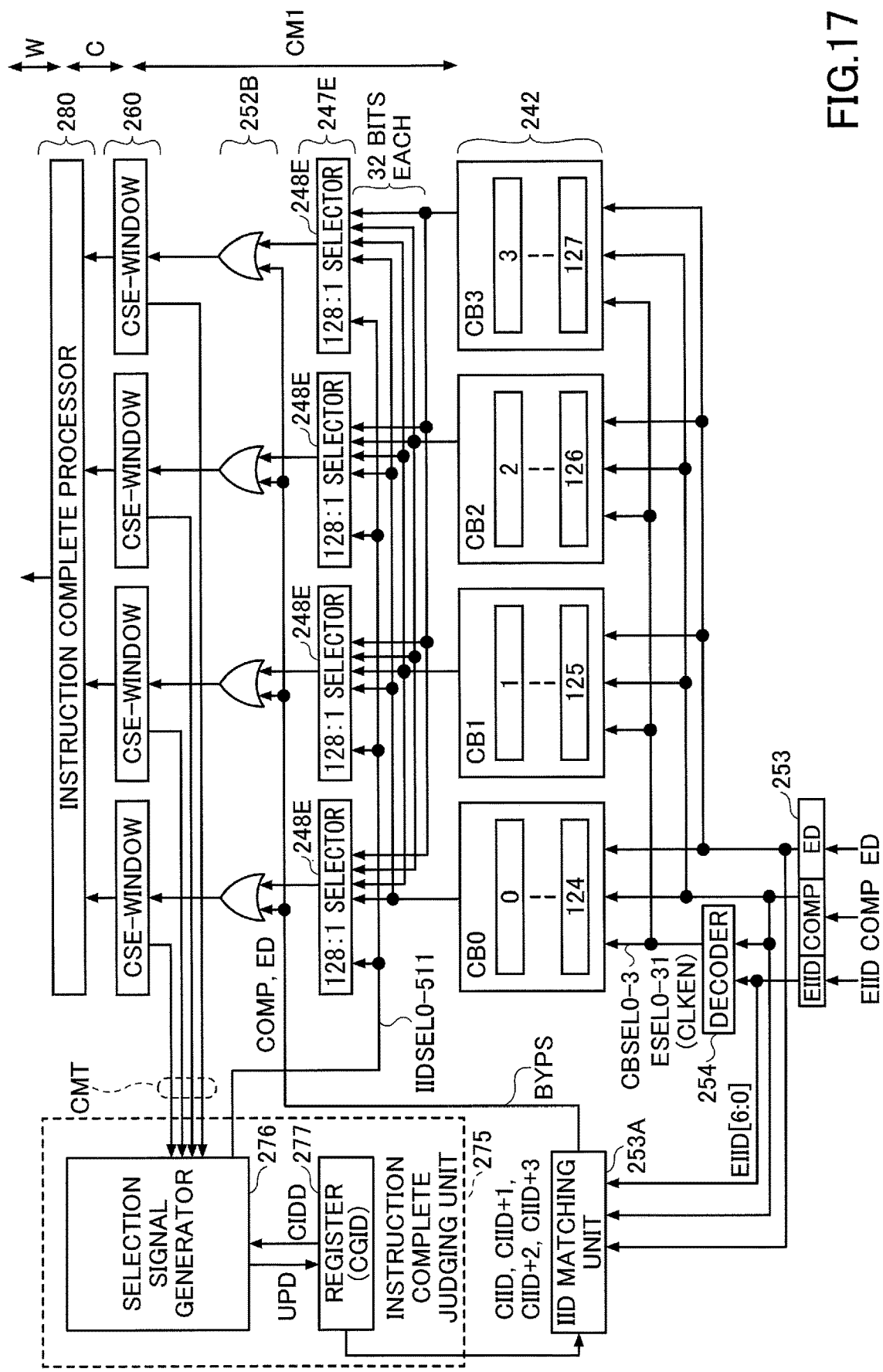
FIG. 17 is a diagram illustrating an example of the CSE 242 and the related circuits of the other instruction complete controller.

FIG. 17 is a diagram illustrating an example of the CSE 242 and the related circuits of the other instruction complete controller. In FIG. 17, those parts that are the same or similar to those corresponding parts in FIG. 9 are designated by the same reference numerals, and a detailed description thereof will be omitted.

The instruction complete controller illustrated in FIG. 17 includes the latch unit 253, the decoder unit 254, an IID matching unit (or circuit) 253A, the CSE 242, a selector unit (or circuit) 247E, the OR unit 252B, the instruction complete judging unit 275, the CSE-WINDOW 260, and the instruction complete processor 280. The CSE-WINDOW 260, the instruction complete processor 280, and the instruction complete judging unit 275 are common to the circuits illustrated in FIG. 16.

The latch unit 253, the decoder unit 254, the CSE 242, the OR unit 252B, and the CSE-WINDOW 260 are the same as in FIG. 9. The IID matching unit 253A includes the same functions as the IID matching unit 252A illustrated in FIG. 9, except for comparing each of the CIID (CIID, CIID+1, CIID+2, and CIID+3) received from the register 277 with the EIDD. In a case where there is a CIID matching the EIDD, the IID matching unit 253A outputs the complete report COMP and the data ED to the OR circuit of the OR unit 252B corresponding to the matching CIID, via the interconnection (or bypass route) BYPS. The selector unit 247E include the same functions as the selector unit 248D illustrated in FIG. 16, except for the different number of bits that are selected.

According to FIG. 17, 512 interconnections for the selection signals IIDSEL are provided, so that the complete report COMP and the data ED held by each of the entries of the CSE 242 can be stored in any of the 4 CSE-WINDOW parts of the CSE-WINDOW 260, similar to FIG. 16. In addition, interconnections are provided to transfer the complete report COMP and the data ED from each of the entries of the 4 column blocks CB0 through CB3 to 4 selectors 248E of the selector unit 247E. Accordingly, the circuit scale required to read the instruction data D0 to the CSE-WINDOW 260 is large compared to the circuit scale illustrated in FIG. 9. In other words, according to FIG. 9, the circuit scale of the instruction complete controller 22 can be reduced compared to the circuit scale illustrated in FIG. 17, because the interconnections for obtaining the complete report COMP and the data ED stored in an arbitrary one of the column blocks CB0 through CB3 to an arbitrary one of the 4 CSE-WINDOW parts of the CSE-WINDOW 260 are not required in FIG. 9.

FIG. 18 is a diagram illustrating an example of assignments of instruction data or the like stored in the CSE 240 illustrated in FIG. 16 and the CSE 242 illustrated in FIG. 17. A detailed description of the assignment similar to the assignment illustrated in FIG. 11 will be omitted. The numerical value within each entry illustrated in FIG. 18 indicates the IID, and CB0 through CB3 in round brackets indicate the column blocks CB0 through CB3 to which the instruction data D is assigned.

The assignment in the first cycle and the second cycle is similar to the assignment in the first cycle and the second cycle illustrated in FIG. 11. Because there is no unused (or unobtainable) IID in FIG. 18, in the third cycle, the instruction data D or the like is assigned, in order, to the entries corresponding to IID=7 through IID=10. For example, the instruction data D decoded by the decode slot DS1 is stored in the column block CB0.

In the fourth cycle, the instruction data D decoded by the decode slot DS0 is stored in the column block CB3, and the instruction data D decoded by the decode slot DS1 is stored in the column block CB0, similar to the third cycle. Because the instruction data D assigned to the entries corresponding to IID=13 and IID=14 are not issued in the fourth cycle, the instruction data D assigned to the entries corresponding to IID=13 and IID=14 are reassigned in the fifth cycle. In this case, the instruction data D assigned to the entries corresponding to IID=13 and IID=14 are decoded by the decode slots DS0 and DS1, respectively.

Thereafter, in the sixth through eighth cycles, the instruction data D are assigned, in order, without generating the unused (or unobtainable) IID.

According to the instruction complete controller illustrated in FIG. 16 and FIG. 17, the decode slots DS and the column blocks CB do not correspond to each other. For this reason, the instruction data D decoded by the decode slot DS is not only assigned to the column block CB0, but also to the column blocks CB1 through CB3, as indicated in the column for the decode slot DS0 in the table. Hence, the selector unit 256, a large number of interconnections, or the like are provided, as illustrated in FIG. 16.

The assignment of the complete report COMP, the data ED, or the like to the CSE 242 is similar to the assignment with respect to the CSE 240, except that the assignment is performed for every instruction, based on the IID and the complete report COMP from the computing unit 40 or the like.

FIG. 19 is a diagram illustrating an example of assignments of instruction data or the like stored in the CSE-WINDOW 260 illustrated in FIG. 16 and FIG. 17. A detailed description of the assignment similar to the assignment illustrated in FIG. 12 will be omitted. The numerical value within each entry illustrated in FIG. 19 indicates the IID, and CB0 through CB3 in round brackets indicate the column blocks CB0 through CB3 to which the instruction data D is assigned. In addition, the "C" indicated on the right side of the entry in the table indicates a state (committed state) where the complete notification of the corresponding instruction is issued, and the entry without the "C" indicated on the right side indicates that the complete notification of the corresponding instruction is not issued.

In the first cycle, the assignment is similar to the assignment in the first cycle illustrated in FIG. 12. In the second cycle, the instruction corresponding to IID=7 is in the committed state, but the instruction corresponding to IID=6 is not in the committed state and is not committed. In this case, in the third cycle, the instructions corresponding to IID=6 through IID=9 are assigned to the 4 CSE-WINDOW parts of the CSE-WINDOW 260, respectively.

In the third cycle, the instruction corresponding to IID=9 is not in the committed state. Hence, in the fourth cycle, the instructions corresponding to IID=9 through IID=12 are assigned to the 4 CSE-WINDOW parts of the CSE-WINDOW 260, respectively.

In FIG. 19, the instruction data D or the like are successively assigned, in order, to all of the 4 CSE-WINDOW parts of the CSE-WINDOW 260. For this reason, the instruction data D or the like held in all of the column blocks CB0 through CB3 may be set to each of the 4 CSE-WINDOW parts of the CSE-WINDOW 260, similar to FIG. 18. Accordingly, the large number of interconnections, the selector unit 256, or the like are provided, as illustrated in FIG. 16 and FIG. 17.

According to the second embodiment described above in conjunction with FIG. 3 through FIG. 15, the switching unit and the interconnections need not be provided on the input side and the output side of the CSE 240 and the CSE 242, similar to the first embodiment illustrated in FIG. 1. As a result, it is possible to reduce the increase of the circuit scale of the processing device 102.

Further, in the second embodiment described above in conjunction with FIG. 3 through FIG. 15, the entry of the CSE 240 can be selected using the GID. Hence, compared to the case where the IID is used to select the entry of the CSE 240, it is possible to reduce the circuit scale of the group decode unit 243.

In a case where one of the instructions assigned the IID corresponding to the group number GID is not committed, as in the third and fourth cycles illustrated in FIG. 12, the group number GID is not updated, and the commit judging process is performed in the next cycle to judge whether the instruction that is not committed is committed in this next cycle. Hence, the commit judging process can be performed without setting the instruction data D corresponding to IID=10 and IID=11 again in the CSE-WINDOW 260, and the operation to set the instruction data D to the CSE-WINDOW 260 can be performed in a simple manner.

In a case where the storage of the instruction data D to the CSE 240 illustrated in FIG. 8 is performed based on the GID, the storage of the complete report COMP to the CSE 242 is performed based on the IID. Hence, the instruction decode unit 16 can issue the IID without issuing the GID to the computing units 40 and 42 or the like, and existing circuits including the reservation station 20 may be utilized to design the processing device 102.

In the case where the group commit is not satisfied, the newly generated complete report COMP may be set to the CSE-WINDOW 260, using the group selection signals GSEL0 through GSEL31 that are common to the 4 selectors 246E. Hence, the structure of the circuit that sets the complete report to the CSE-WINDOW 260 may be made simple compared to the circuit structure illustrated in FIG. 16.

The bypass function of the complete report COMP and the data ED can be achieved by providing the IID matching unit 252A, and the complete process can be started without waiting for the complete report COMP from the column blocks CB0 through CB3.

By providing the selector 246D in correspondence with each column block CB, each selector 246D does not need to select the instruction data D held in the other column blocks CB. As a result, it is possible to reduce the circuit scale of each selector 246D and the number of interconnections connected to the selectors 246D.

In the case where one of the instructions assigned the IID corresponding to the group number GID is not committed, the instruction complete controller 22 does not update the group number GID, and judges, in the next cycle, whether the instruction that is not committed is committed in this next cycle. Hence, the commit judging process can be performed without setting the instruction data D of the not committed instruction again in the CSE-WINDOW 260, and the operation to set the instruction data D to the CSE-WINDOW 260 can be performed in a simple manner.

By regarding the IID not assigned to the instruction as the unused (or unobtainable) number, it is possible to determine the IID assigned for every decode slot DS without an overlap. As a result, it is possible to reduce the number of interconnections connected to the CSE 240 and the CSE 242, to reduce the increase of the circuit scale.

Figure 20:
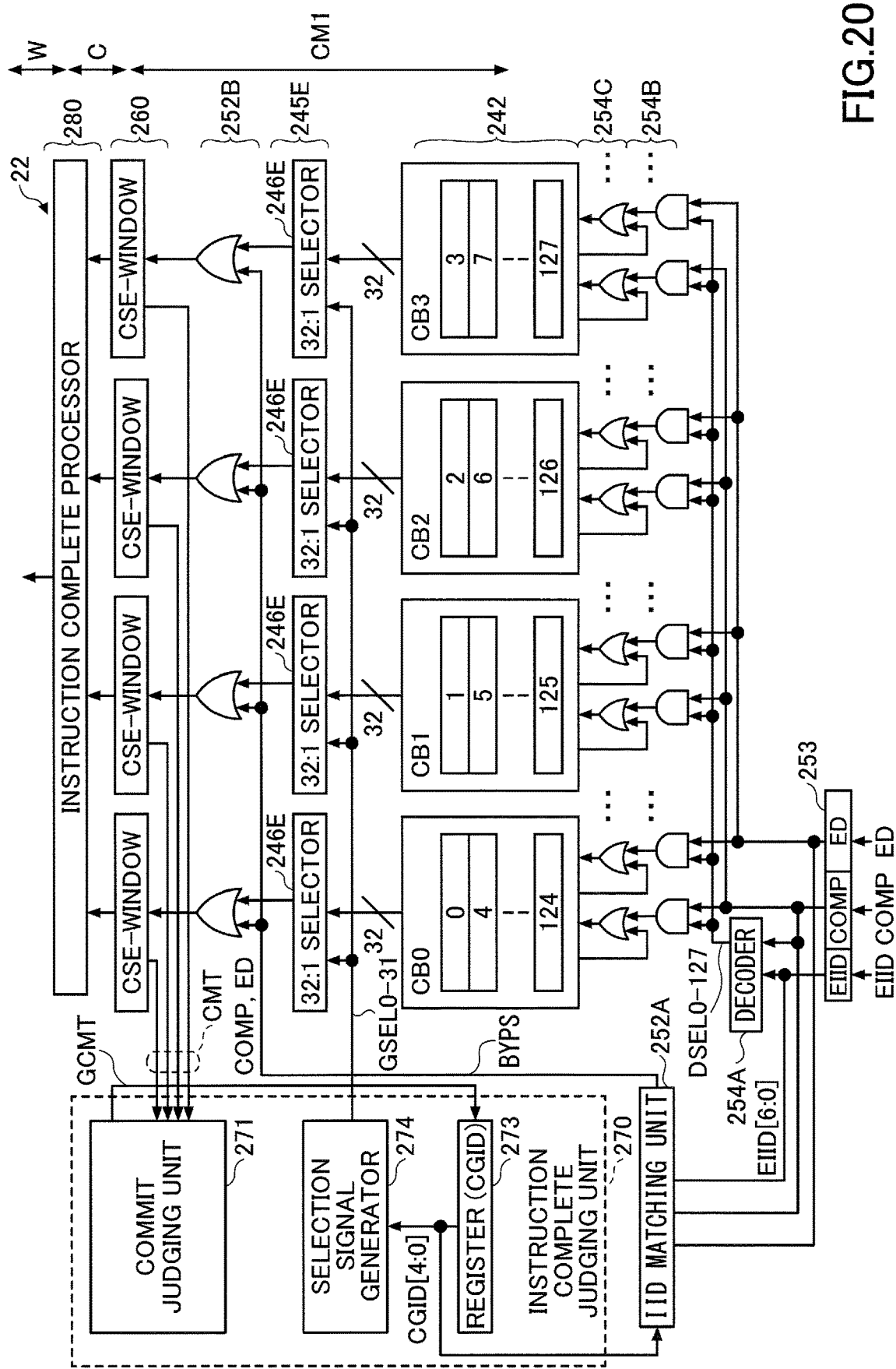
FIG. 20 is a diagram illustrating an example of the CSE 242 and the related circuits included in the processing device according to a third embodiment.

FIG. 20 is a diagram illustrating an example of the CSE 242 and the related circuits included in the processing device according to a third embodiment. In FIG. 20, a decoder 254A, an AND unit 254B, and an OR unit 254C are provided in place of the decoder 254 illustrated in FIG. 9. Other structures and functions of the processing device are similar to the structures and functions illustrated in FIG. 3 through FIG. 15. In other words, the circuit structure used to store information in the CSE 242 differs from that of the processing device 102 illustrated in FIG. 3.

In this embodiment, the complete report COMP and the data ED input to the latch unit 253 are stored in the entries of each of the column blocks CB0 through CB3, without using the control by the clock enable signal CLKEN.

The decoder 254A sets one of selection signals DSEL (DSEL0 through DSEL127) for selecting the 128 entries to the valid level, based on the complete report COMP and the EIID held in the latch unit 253. The AND unit 254B includes AND circuits provided for the complete report COMP and AND circuits provided for the data ED, in correspondence with each of the selection signals DSEL. The OR unit 254C includes OR circuits provided for the complete report COMP and OR circuits provided for the data ED, in correspondence with each of the selection signals DSEL.

Each AND circuit of the AND unit 254B outputs the complete report COMP or the data ED to the OR circuit, when the corresponding selection signal DSEL is set to the valid level. When the OR circuit of the OR unit 254C receives the complete report COMP or the data ED from the AND circuit, the OR circuit stores the complete report COMP or the data ED that is received in the corresponding entry. In addition, when the OR circuit of the OR unit 254C does not receive the complete report COMP nor the data ED from the AND circuit, the OR circuit loops back the complete report COMP or the data ED output from the corresponding entry to the corresponding entry.

According to the structure illustrated in FIG. 20, it is possible to continue holding the previously received information in one entry of the CSE 242 without losing the information, even in a case where the complete report COMP and the data ED are received in pieces over a plurality of cycles due to causes such as circuit delay, wiring delay, or the like.

Figure 21:
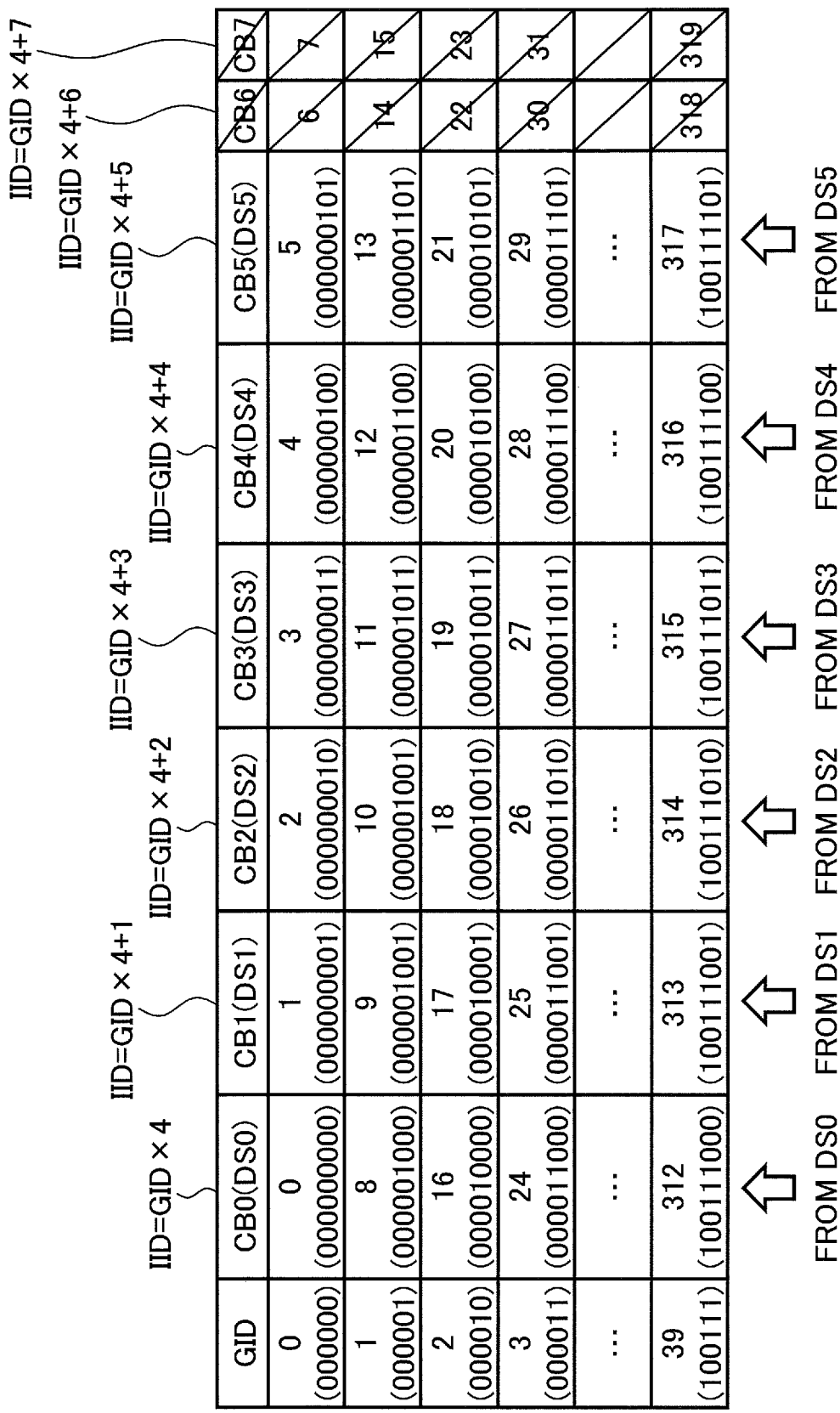
FIG. 21 is a diagram illustrating the CSE included in the processing device according to the third embodiment.

FIG. 21 is a diagram illustrating the CSE included in the processing device according to the third embodiment. The CSE corresponds to each of the CSE 240 illustrated in FIG. 8 and the CSE 242 illustrated in FIG. 9. The instruction decode unit 16 of the processing device including the CSE illustrated in FIG. 21 includes 6 decode slots DS0 through DS5. In other words, the processing device including the CSE illustrated in FIG. 21 is a superscalar processor, for example. The structures and functions of the processing device, other than the CSE and the decode slots DS0 through DS5, are similar to the structures and functions described above in conjunction with FIG. 3 through FIG. 15.

The CSE includes 6 column blocks CB0 through CB5 respectively including 40 entries, and thus, the CSE includes 240 entries in total. The numerical value indicated on the left side within each entry indicates the IID, and the numerical value in round brackets indicates the IID represented by a binary number. The assignment of the IID to the CSE is performed by assuming that column blocks CB6 and CB7 exist. In other words, the IID to be assigned to the column blocks CB6 and CB7 are regarded as unused (or unobtainable) numbers.

In a case where the instruction decode unit 16 includes 3 or more decode slots DS, and not $2^n$ decode slots DS, where n is an integer greater than or equal to 1, the assignment of the IID to the entries is performed by assuming that there are $2^n$ decode slots DS. In addition, the IID that is assigned to the instruction when it is assumed that the instruction is decoded by the decode slot DS that does not exist, is regarded as an unused (or unobtainable) number.

Accordingly, the IID that is assigned to the column block CB0 is a value obtained by multiplying 4 to the group number GID, and the IID that is assigned to column block CB1 is a value obtained by multiplying 4 to the group number GID and adding 1. The IID that is assigned to the column block CB2 is a value obtained by multiplying 4 to the group number GID and adding 2, and the IID that is assigned to the column block CB3 is a value obtained by multiplying 4 to the group number GID and adding 3. The IID that is assigned to the column block CB4 is a value obtained by multiplying 4 to the group number GID and adding 4, and the IID that is assigned to the column block CB5 is a value obtained by multiplying 4 to the group number GID and adding 5.

In the CSE illustrated in FIG. 21, the data of the instruction decoded by the decode slot DS0 is stored in the column block CB0, and the data of the instruction decoded by the decode slot DS1 is stored in the column block CB1. The data of the instruction decoded by the decode slot DS2 is stored in the column block CB2, and the data of the instruction decoded by the decode slot DS3 is stored in the column block CB3. The data of the instruction decoded by the decode slot DS4 is stored in the column block CB4, and the data of the instruction decoded by the decode slot DS5 is stored in the column block CB5.

Accordingly, in the case where the number of decode slots DS is not $2^n$, the IID is assigned to the entries of each column block CB by assuming that the number of decode slots DS is $2^n$, so that the GID matches the upper 6 bits of the IID, for example. Hence, the entries that are to store the instruction data D or the like are determined using the GID, without providing a decoder for the IID. As a result, it is possible to reduce the interconnections and circuits required to store the instruction data D or the like to the CSE, and to reduce the interconnections and circuits required to transfer the instruction data D or the like from the CSE to the CSE-WINDOW 260. In addition, because the number assigned to the column block CB matches the lower 3 bits of the IID, it is possible to specify the number assigned to the column block CB from the IID.

Figure 22:
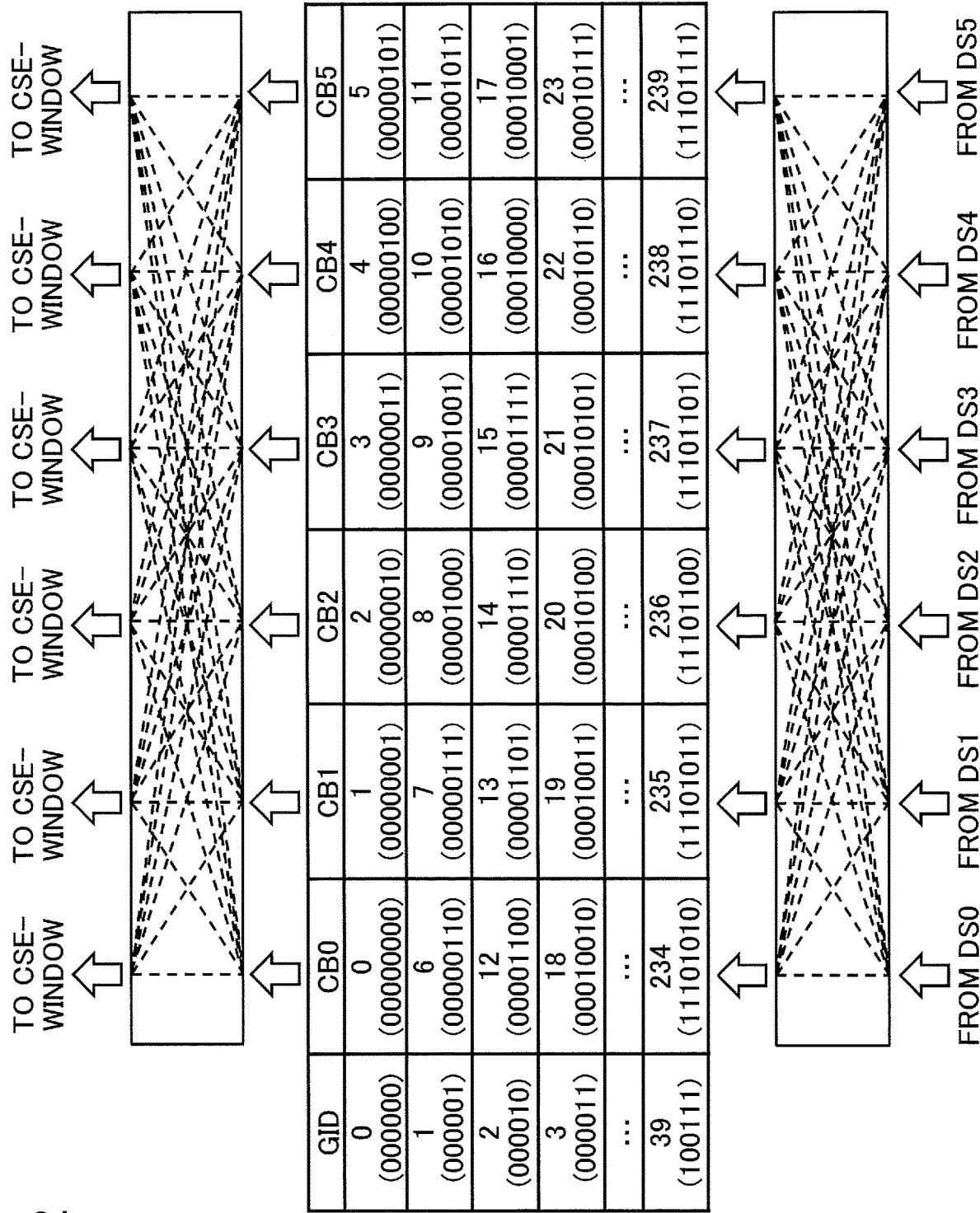
FIG. 22 is a diagram illustrating the CSE included in the processing device according to another comparison example.

FIG. 22 is a diagram illustrating the CSE included in the processing device according to another comparison example. The CSE corresponds to each of the CSE 240 illustrated in FIG. 8 and the CSE 242 illustrated in FIG. 9. The instruction decode unit 16 of the processing device including the CSE illustrated in FIG. 22 includes 6 decode slots DS0 through DS5.

The structure of the CSE illustrated in FIG. 22 is the same as the structure of the CSE illustrated in FIG. 21, except that the assignment of the IID is different. In FIG. 22, there is no unused (or unobtainable) number in the IDD, and thus, the IID having a value that increases by 1 is successively assigned to the column blocks CB0 through CB5. In this case, a decoder is provided exclusively for obtaining the column block CB that stores the instruction data D or the like using the IID. In addition, a decoder is provided exclusively for obtaining the GID (that is, the entry) where the instruction data D or the like is stored using the IID. Further, a switching unit and a large number of interconnections are provided on the input side and on the output side of the CSE to input and output the instruction data D or the like. As a result, the scale of the circuits provided in the periphery of the CSE illustrated in FIG. 22 increases compared to the scale of the circuits provided in the periphery of the CSE illustrated in FIG. 21.

According to the embodiment illustrated in FIG. 21, even in the case where the instruction decode unit 16 includes a number of decode slots DS that is not $2^n$, where n is the integer greater than or equal to 1, the entries that are to store the instruction data D or the like can be determined using the IID, without providing a decoder for the IID. As a result, it is possible to reduce the interconnections and circuits required to store the instruction data D or the like to the CSE, and to reduce the interconnections and circuits required to transfer the instruction data D or the like from the CSE to the CSE-WINDOW 260.

According to one aspect of the embodiments, it is possible to provide a processing device, and a method of controlling the processing device, which can reduce the increase of the scale of circuits and interconnections used to store instruction information to and obtain the instruction information from an instruction complete holding unit that is used in an instruction complete process.

Although the embodiments are numbered with, for example, "first," "second," "third," or "fourth," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processing device comprising:
  an instruction decode circuit including a plurality of decoders configured to decode instructions respectively assigned an instruction number that is determined for every one of the plurality of decoders;
  an instruction execution circuit configured to execute the instructions decoded by the instruction decode circuit;
  an instruction complete holding circuit including a plurality of hold blocks provided in correspondence with each of the plurality of decoders and respectively including a plurality of hold regions, wherein the instruction number is assigned to each of the plurality of hold regions, and used for an instruction complete process; and
  an instruction complete controller configured to store instruction information that is generated by decoding the instructions by the plurality of decoders, in one of the plurality of hold regions of the hold block corresponding to a decoder that decodes the instruction, based on the instruction number, and obtain, in order, the instruction information corresponding to the instructions executed by the instruction execution circuit from the instruction complete holding circuit, to perform the instruction complete process,
  the instruction decode circuit assigns a group number in correspondence with a plurality of instruction numbers assigned to the instruction for every cycle, and outputs the assigned group number to the instruction complete controller together with the instruction information generated by the plurality of decoders, and
  the instruction complete controller stores the instruction information received from the instruction decode circuit in a hold region assigned the instruction number corresponding to the group number, among the plurality of hold regions of the hold block.

2. The processing device as claimed in claim 1, wherein the instruction complete controller includes an instruction complete buffer configured to hold instruction information corresponding to an oldest group number assigned to the instruction of an oldest cycle the execution of which is not completed, and the instruction complete controller updates the group number to transfer the plurality of instruction information corresponding to a next group number from one of the plurality of hold regions to the instruction complete buffer, in a case where execution of all of the instructions corresponding to the oldest group number is completed, and does not update the group number to inhibit transfer of the instruction information from one of the plurality of hold regions to the instruction complete buffer, in a case where execution of one of the plurality of instructions corresponding to the oldest group number is not completed.

3. The processing device as claimed in claim 1, wherein the instruction decode circuit does not update the group number in a case where the decoded instruction cannot be issued, and redecodes the instruction, not issued, in a next cycle.

4. The processing device as claimed in claim 2, wherein the instruction complete controller upon receipt of complete report information indicating completion of execution of the instruction and the instruction number, stores the complete report information in the hold region assigned the received instruction number, among the plurality of hold regions of each of the plurality of hold blocks, and judges completion of execution of each instruction corresponding to the oldest group number, based on the complete report information.

5. The processing device as claimed in claim 2, wherein the instruction complete controller includes a selector circuit, provided in correspondence with each of the plurality of hold blocks, and configured to select the instruction information held in the plurality of hold regions of each of the plurality of hold blocks based on the group number, and output the selected instruction information to the instruction complete buffer.

6. The processing device as claimed in claim 4, wherein the instruction complete controller does not update the group number, and transfers the complete report information read from one of the plurality of hold regions corresponding to the group number to the instruction complete buffer, in a case where execution of one of the plurality of instructions corresponding to the oldest group number is not completed.

7. The processing device as claimed in claim 4, wherein the instruction complete controller includes a judging circuit configured to judge whether a group number corresponding to the instruction number and the oldest group number match, based on the complete report information and the instruction number that are received, and a bypass route configured to bypass the received complete report information to the instruction complete buffer, in a case where the judging circuit judges that the group number corresponding to the instruction number and the oldest group number match.

8. A processing device comprising:

an instruction decode circuit including a plurality of decoders configured to decode instructions respectively assigned an instruction number that is determined for every one of the plurality of decoders;

an instruction execution circuit configured to execute the instructions decoded by the instruction decode circuit;

an instruction complete holding circuit including a plurality of hold blocks provided in correspondence with each of the plurality of decoders and respectively including a plurality of hold regions, wherein the instruction number is assigned to each of the plurality of hold regions, and used for an instruction complete process; and an instruction complete controller configured to store instruction information that is generated by decoding the instructions by the plurality of decoders, in one of the plurality of hold regions of the hold block corresponding to a decoder that decodes the instruction, based on the instruction number, and obtain, in order, the instruction information corresponding to the instructions executed by the instruction execution circuit from the instruction complete holding circuit, to perform the instruction complete process, the instruction decode circuit regards an instruction number that cannot be assigned to the instruction as an unused number, in a case where one of the plurality of decoders does not decode the instruction.

9. A processing device comprising:

an instruction decode circuit including a plurality of decoders configured to decode instructions respectively assigned an instruction number that is determined for every one of the plurality of decoders;

an instruction execution circuit configured to execute the instructions decoded by the instruction decode circuit;

an instruction complete holding circuit including a plurality of hold blocks provided in correspondence with each of the plurality of decoders and respectively including a plurality of hold regions, wherein the instruction number is assigned to each of the plurality of hold regions, and used for an instruction complete process; and an instruction complete controller configured to store instruction information that is generated by decoding the instructions by the plurality of decoders, in one of the plurality of hold regions of the hold block corresponding to a decoder that decodes the instruction, based on the instruction number, and obtain, in order, the instruction information corresponding to the instructions executed by the instruction execution circuit from the instruction complete holding circuit, to perform the instruction complete process, the instruction decode circuit includes a number of decoders, that is 3 or more but excludes $2^n$, where n is an integer greater than or equal to 1, and the instruction number is assigned to the plurality of hold regions by assuming the number of decoders as being $2^n$, and regarding the instruction number assigned to the instruction that is assumed to be decoded by a decoder that does not exist as an unused number.

10. A method of controlling a processing device which includes an instruction decode circuit including a plurality of decoders decoding instructions, an instruction complete holding circuit including a plurality of hold regions assigned an instruction number, and used for an instruction complete process, the method comprising:

determining an instruction number for every one of the plurality of decoders;

including, in the instruction complete holding circuit, a plurality of hold blocks respectively including the plurality of hold regions provided in correspondence with each of the plurality of decoders;

storing, by an instruction complete controller of the processing device, instruction information that is generated by decoding the instructions by the plurality of decoders, in one of the plurality of hold regions of the hold block corresponding to a decoder that decodes the instruction, based on the instruction number; and obtaining, in order, by the instruction complete controller, the instruction information corresponding to the instructions executed by the instruction execution circuit from the instruction complete holding circuit, to perform the instruction complete process;

assigning, by the instruction decode circuit, a group number in correspondence with a plurality of instruction numbers assigned to the instruction for every cycle, and outputting the assigned group number to the instruction complete controller together with the instruction information generated by the plurality of decoders; and storing, by the instruction complete controller, the instruction information received from the instruction decode circuit in a hold region assigned the instruction number corresponding to the group number, among the plurality of hold regions of the hold block.

11. The method of controlling the processing device as claimed in claim 10, wherein the instruction complete controller includes an instruction complete buffer configured to hold instruction information corresponding to an oldest group number assigned to the instruction of an oldest cycle the execution of which is not completed, and further comprising:

updating, by the instruction complete controller, the group number to transfer the plurality of instruction information corresponding to a next group number from one of the plurality of hold regions to the instruction complete buffer, in a case where execution of all of the instructions corresponding to the oldest group number is completed; and not updating, by the instruction complete controller, the group number to inhibit transfer of the instruction information from one of the plurality of hold regions to the instruction complete buffer, in a case where execution of one of the plurality of instructions corresponding to the oldest group number is not completed.

12. The method of controlling the processing device as claimed in claim 11, further comprising:

upon receipt of complete report information indicating completion of execution of the instruction and the instruction number, storing, by the instruction complete controller, the complete report information in the hold region assigned the received instruction number, among the plurality of hold regions of each of the plurality of hold blocks; and judging, by the instruction complete controller, completion of execution of each instruction corresponding to the oldest group number, based on the complete report information.

13. The method of controlling the processing device as claimed in claim 12, wherein the instruction complete controller does not update the group number, and transfers the complete report information read from one of the plurality of hold regions corresponding to the group number to the instruction complete buffer, in a case where execution of one of the plurality of instructions corresponding to the oldest group number is not completed.

14. The method of controlling the processing device as claimed in claim 12, further comprising:

judging, by a judging circuit of the instruction complete controller, whether a group number corresponding to the instruction number and the oldest group number match, based on the complete report information and the instruction number that are received; and bypassing, by a bypass route of the instruction complete controller, the received complete report information to the instruction complete buffer, in a case where the judging circuit judges that the group number corresponding to the instruction number and the oldest group number match.

15. The method of controlling the processing device as claimed in claim 11, further comprising:

selecting, by a selector circuit of the instruction complete controller provided in correspondence with each of the plurality of hold blocks, the instruction information held in the plurality of hold regions of each of the plurality of hold blocks based on the group number, and output the selected instruction information to the instruction complete buffer.

16. The method of controlling the processing device as claimed in claim 10, wherein the instruction decode circuit does not update the group number in a case where the decoded instruction cannot be issued, and redecodes the instruction, not issued, in a next cycle.

* * * * *